US011165856B2

(12) United States Patent
Baradaran et al.

(10) Patent No.: US 11,165,856 B2
(45) Date of Patent: Nov. 2, 2021

(54) DETECTING UNEVEN LOAD BALANCING THROUGH MULTI-LEVEL OUTLIER DETECTION

(71) Applicant: Citrix Systems, Inc., Fort Lauderdale, FL (US)

(72) Inventors: Nastaran Baradaran, San Jose, CA (US); Muraliraja Muniraju, Fremont, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 592 days.

(21) Appl. No.: 15/496,675

(22) Filed: Apr. 25, 2017

(65) Prior Publication Data

US 2018/0309822 A1    Oct. 25, 2018

(51) Int. Cl.
*H04L 29/08* (2006.01)
*H04L 12/24* (2006.01)
*H04L 12/26* (2006.01)

(52) U.S. Cl.
CPC ...... *H04L 67/1008* (2013.01); *H04L 41/0816* (2013.01); *H04L 41/0893* (2013.01); *H04L 41/142* (2013.01); *H04L 43/0876* (2013.01); *H04L 43/10* (2013.01); *H04L 43/14* (2013.01)

(58) Field of Classification Search
CPC .................................................. H04L 41/142
See application file for complete search history.

(56) References Cited

U.S. PATENT DOCUMENTS

| | | | | |
|---|---|---|---|---|
| 2004/0073639 A1* | 4/2004 | Basoglu | ............... | G06F 9/5083 709/223 |
| 2007/0121596 A1* | 5/2007 | Kurapati | ............. | H04M 7/0078 370/356 |
| 2008/0148180 A1* | 6/2008 | Liu | ..................... | G06F 11/3409 715/800 |
| 2013/0054822 A1* | 2/2013 | Mordani | ............. | H04L 67/1034 709/228 |
| 2013/0179568 A1* | 7/2013 | Huang | .................... | H04L 43/04 709/224 |
| 2013/0198245 A1* | 8/2013 | Kagan | .................... | G01D 4/004 707/812 |
| 2015/0365305 A1* | 12/2015 | Namata | ................. | H04L 43/062 705/14.54 |
| 2016/0142435 A1* | 5/2016 | Bernstein | ............ | H04L 63/1441 726/23 |
| 2016/0173525 A1* | 6/2016 | Thomas | ................ | H04L 63/145 726/23 |

(Continued)

*Primary Examiner* — Ario Etienne
*Assistant Examiner* — S M Z Islam
(74) *Attorney, Agent, or Firm* — Foley & Lardner LLP

(57) ABSTRACT

The present disclosure is directed towards systems and methods of detecting a cause of anomalous load balancing among a plurality of servers. A device intermediary to a plurality of clients and a plurality of servers collects values of a plurality of counters. The device identifies a server of the plurality of servers that is an outlier. The device can identify a counter of the plurality of counters that is an outlier based on at least a comparison of values of each of the plurality of counters for each of the plurality of servers. The device can provide, responsive to the determination, an indication that a value of the counter is a factor causing the server to have uneven load balancing during the time interval.

20 Claims, 17 Drawing Sheets

(56) References Cited

U.S. PATENT DOCUMENTS

2016/0182542 A1* 6/2016 Staniford ............ H04L 63/1416
            726/23
2016/0219035 A1* 7/2016 Zhou ................... H04L 61/1523
2017/0250855 A1* 8/2017 Patil ...................... H04L 41/064

* cited by examiner

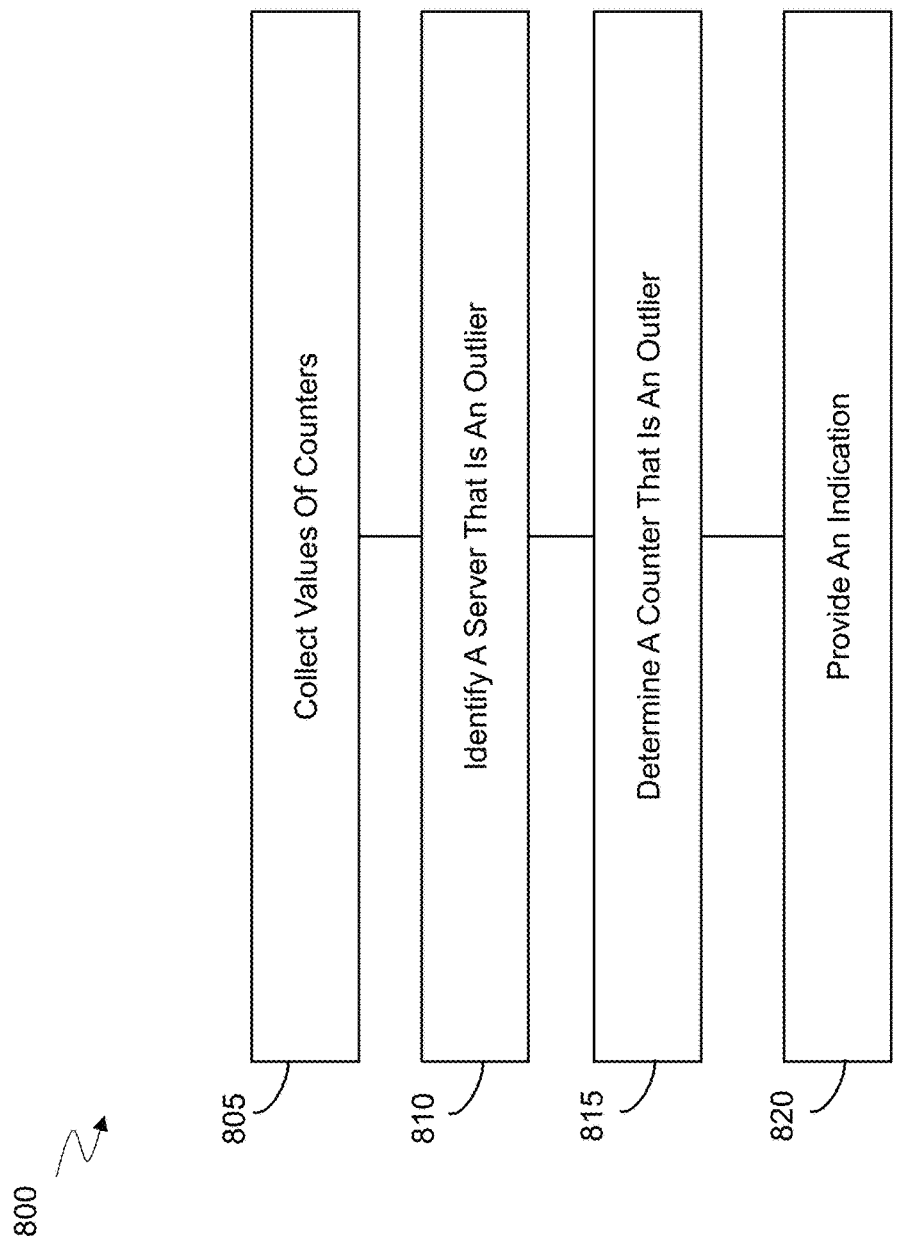

DETECTING UNEVEN LOAD BALANCING THROUGH MULTI-LEVEL OUTLIER DETECTION

FIELD OF THE DISCLOSURE

The present application generally relates to detecting uneven load balancing through multi-level outlier detection. In particular, the present application relates to systems and methods for detecting a cause of anomalous load balancing among a plurality of servers.

BACKGROUND OF THE DISCLOSURE

A client device can access or use an application, service, or infrastructure provided via computing infrastructure that includes backend servers. The client device can access one or more backend servers of the computing infrastructure via an intermediary device that is intermediary to the client device and the backend servers. To facilitate distributing load among the servers, the intermediary device can include a load balancer. The load balancer can use a load balancing technique to distribute the client requests and network traffic among various backend servers. However, one or more of the backend servers may not receive an even share of the load, causing the load on the remaining backend servers to increase. The increased load on the remaining backend servers can impact the overall server delay, processing delay, latency, and end user experience.

BRIEF SUMMARY OF THE DISCLOSURE

The present disclosure is directed towards systems and methods for detecting uneven load balancing through multi-level outlier detection. In particular, the present application relates to systems and methods for detecting a cause of anomalous load balancing among a plurality of servers. The anomalous load balancing can refer to or include one or more of the backend servers not receiving an even share of the load, and can be due to a malfunction, misconfiguration, or other network issues that can cause the load on the remaining backend servers to increase.

For example, the system can identify a scenario in which a virtual server executed by a device intermediary to client and backend servers is load-balancing its backend servers unevenly. This behavior can lead to a larger than expected overall delay for client requests and directly impact the user experience. The system can identify and mitigate the case of the uneven load balancing using multi-level algorithm, function, process or technique. In the multi-level process, the system can automatically identify that an uneven load exists among the backend server, and then automatically correlate the uneven load with one or more possible causes from a predetermined list of potential causes.

The intermediary device can periodically collect, obtain or otherwise identify values of various counters showing the behavior of different servers and virtual servers (vservers). For each time stamp, the intermediary device can monitor the loads assigned by each vserver (e.g., load balancer vserver running on the intermediary device) to corresponding backend servers, and detect anomalous behavior. For example, the intermediary device can identify cases where one or more server loads are different than others using a statistical technique (e.g., a Box Plot method) to detect outliers. Once this anomaly is identified, the intermediary device can correlate the anomaly with other counters that indicate the cause of the uneven load. Counters can include, for example, server delay counters, persistence counters (which can indicate that a particular subset of traffic is being sent to a particular server), surge counters, etc. While anomalies in some of these counters (e.g., server delay counter) can indicate a genuine problem, the anomalies in other counters (e.g., persistence counter) can indicate a configuration side-effect.

To identify that an uneven load exists among the backend server, and then automatically correlate the uneven load with one or more possible causes from a predetermined list of potential causes, the system can be configured with the following process. For each time stamp T, the system can collect all serverHits counters and dissect them based on their associations with a vserver. For each vserver V and its corresponding backend servers $S1, S2, \ldots, Sn$, the system can:

1. Define a set of counters that can be the cause of an uneven load balancer;
2. Find the outliers in serverHits in $[S1, S2, \ldots, Sn]$ using a Box Plot (or any global outlier detection) algorithm;
3. If any server Sk is an outlier:
   a. For each possible culprit counter C defined in step 1:
      i. Find the counter values $C1, \ldots, Cn$ associated with $S1, \ldots, Sn$ at time stamp T
      ii. Find the outliers in $[C1, \ldots, Cn]$ using the Box plot method
      iii. If counter Ck (counter C associated with server k) is an outlier, call out counter Ck as the causing factor of the anomaly of serverHits in Sk.
         1. If C is a counter defined by configuration ignore the anomaly in serverHits. It is the expected behavior.
         2. If C is any other counter, contribute the anomaly of serverHits to the anomaly of C for server k.
   b. If none of the counters C for server k is an outlier, raise a flag that the anomaly in Sk's load can't be explained.

At least one aspect is directed to a method of detecting a cause of anomalous load balancing among a plurality of servers. The method can include a device intermediary to a plurality of clients and a plurality of servers collecting values of a plurality of counters. The values of the plurality of counters can identify statistics of the plurality of servers and one or more virtual servers of the device load balancing the plurality of servers. The method can include an anomaly detector executed by the device identifying a server of the plurality of servers that is an outlier. The anomaly detector can identify the outlier that indicates uneven load balancing. The anomaly detector can identify the outlier based on at least a comparison of a number of server hits for each of the plurality of during a time interval. The method can include the anomaly detector determining a counter of the plurality of counters that is an outlier based on at least a comparison of values of each of the plurality of counters for each of the plurality of servers. The method can include the anomaly detector providing, responsive to the determination, an indication that a value of the counter is a factor causing the server to have uneven load balancing during the time interval.

In some embodiments, the device intermediary to the plurality of servers and the one or more virtual servers can establish the plurality of counters from a predetermined set of counters that are correlated with causes of uneven load balancing.

The device can determine, for each server of the plurality of servers, a value for each counter of the plurality of counters during the time interval. The device can determine that the counter is the outlier based on a statistical outlier detection algorithm applied to the value for each counter of the plurality of counters for each of the plurality of servers. The device can adjust a load balancer of the device balancing the load on the plurality of servers to even the load on the plurality of servers.

The device can identify, for each counter of the plurality of counters, values associated with each of the plurality of servers during the time interval. The device can determine, based on the identified values and a statistical outlier detection algorithm, that the counter that is the outlier. The device can identify a type of counter corresponding to the counter. The device can determine, based on a policy and the type of counter, the cause of the anomaly.

The device can identify, for each counter of the plurality of counters, values associated with each of the plurality of servers during the time interval. The device can determine, based on the identified values and a statistical outlier detection algorithm, that the counter that is the outlier. The device can identify a type of configuration of the counter. The device can determine, based on a policy and the type of configuration, the cause of the anomaly from a plurality of candidate causes of anomalies.

The device can identify, for each counter of the plurality of counters, values associated with each of the plurality of servers during the time interval. The device can determine, based on the identified values and a statistical outlier detection algorithm, that the counter that is the outlier. The device can identify, from a plurality of types of counters, that the counter is not defined by a configuration. The device can determine, based on the counter not defined by the configuration, that the counter is the cause of the anomaly in the server that is the outlier during the time interval.

The device can identify a second server of the plurality of servers that is a second outlier of uneven load balancing during a second time interval. The device can identify, for each counter of the plurality of counters, values associated with each of the plurality of servers during the second time interval. The device can determine, based on the identified values and a statistical outlier detection algorithm, a second counter from the plurality of outlier counters that is a second outlier. The device can identify, from a plurality of types of counters, that the second counter is defined by a configuration. The device can determine, based on the second counter defined by the configuration, that the second counter is not a cause of an anomaly in the second server during the second time interval.

The device can identify, a second server of the plurality of servers that is a second outlier of uneven load balancing during a second time interval. The device can identify, for each counter of the plurality of counters, values associated with each of the plurality of servers during the second time interval. The device can determine, based on the identified values and a statistical outlier detection algorithm, an absence of any counter among the plurality of counters that is an outlier during the second time interval. The device can select, based on the absence of any counter that is an outlier, a second indication of a cause of an anomaly in the second server. The second indication can be different from the indication.

The device can identify loads on each of the plurality of servers based on server hits during the time interval.

The one or more virtual servers can forward the network traffic from the plurality of client devices to the plurality of servers using at least one of a least connection load balancing technique or a round robin load balancing technique. The anomaly detector can determine the server that is the outlier using a first statistical outlier detection algorithm. The first statistical outlier detection algorithm can include at least one of a box plot, a model, or a normal probability plot. The anomaly detector can determine the counter using a second statistical outlier detection algorithm. The second statistical outlier detection algorithm can include at least one of the box plot, the model, or the normal probability plot.

Another aspect is directed to a system to detect a cause of anomalous load balancing among a plurality of servers. The system can include a device intermediary to a plurality of clients and a plurality of servers. The system can include a monitor and an anomaly detector executed by the device. The monitor can be configured to collect values of a plurality of counters identifying statistics of the plurality of servers and one or more virtual servers of the device load balancing the plurality of servers. The anomaly detector can be configured to identify a server of the plurality of servers that is an outlier. The server can be identified as the outlier which can indicate uneven load balancing. The server can be identified as the outlier based on at least a comparison of a number of server hits for each of the plurality of during a time interval. The anomaly detector can determine a counter of the plurality of counters that is an outlier based on at least a comparison of values of each of the plurality of counters for each of the plurality of servers. The anomaly detector can provide, responsive to the determination, an indication that a value of the counter is a factor causing the server to have uneven load balancing during the time interval.

The device can establish the plurality of counters from a predetermined set of counters that are correlated with causes of uneven load balancing.

The device can determine, for each server of the plurality of servers, a value for each counter of the plurality of counters during the time interval. The device can determine that the counter is the outlier based on a statistical outlier detection algorithm applied to the value for each counter of the plurality of counters for each of the plurality of servers. The device can adjust a load balancer of the device balancing the load on the plurality of servers to even the load on the plurality of servers.

The device can identify, for each counter of the plurality of counters, values associated with each of the plurality of servers during the time interval. The device can determine, based on the identified values and a statistical outlier detection algorithm, that the counter is the outlier. The device can identify a type of counter corresponding to the counter. The device can determine, based on a policy and the type of counter, the cause of the anomaly.

The device can identify, for each counter of the plurality of counters, values associated with each of the plurality of servers during the time interval. The device can determine, based on the identified values and a statistical outlier detection algorithm, that the counter is the outlier. The device can identify a type of configuration of the counter. The device can determine, based on a policy and the type of configuration, the cause of the anomaly from a plurality of candidate causes of anomalies.

The device can identify, for each counter of the plurality of counters, values associated with each of the plurality of servers during the time interval. The device can determine, based on the identified values and a statistical outlier detection algorithm, that the counter is the outlier. The device can identify, from a plurality of types of counters, that the counter is not defined by a configuration. The device can determine, based on the counter not defined by the configuration, that the counter is the cause of the anomaly in the server that is the outlier during the time interval.

The device can identify a second server of the plurality of servers that is a second outlier of uneven load balancing during a second time interval. The device can identify, for each counter of the plurality of counters, values associated with each of the plurality of servers during the second time interval. The device can determine, based on the identified values and a statistical outlier detection algorithm, a second counter from the plurality of outlier counters that is a second outlier. The device can identify, from a plurality of types of counters, that the second counter is defined by a configuration. The device can determine, based on the second counter defined by the configuration, that the second counter is not a cause of an anomaly in the second server during the second time interval.

The device can identify a second server of the plurality of servers that is a second outlier of uneven load balancing during a second time interval. The device can identify, for each counter of the plurality of counters, values associated with each of the plurality of servers during the second time interval. The device can determine, based on the identified values and a statistical outlier detection algorithm, an absence of any counter among the plurality of counters that is an outlier during the second time interval. The device can select, based on the absence of any counter that is an outlier, a second indication of a cause of an anomaly in the second server, the second indication different from the indication.

The device can identify loads on each of the plurality of servers based on server hits during the time interval.

The one or more virtual servers of the device can forward the network traffic from the plurality of client devices to the plurality of servers using at least one of a least connection load balancing technique or a round robin load balancing technique. The anomaly detector can determine the server that is the outlier using a first statistical outlier detection algorithm. The first statistical outlier detection algorithm can include at least one of a box plot, a model, or a normal probability plot. The anomaly detector can determine the counter using a second statistical outlier detection algorithm. The second statistical outlier detection algorithm can include at least one of the box plot, the model, or the normal probability plot.

BRIEF DESCRIPTION OF THE FIGURES

The foregoing and other objects, aspects, features, and advantages of the present solution will become more apparent and better understood by referring to the following description taken in conjunction with the accompanying drawings, in which:

FIG. 8 is a block diagram of an embodiment of a method of detecting a cause of anomalous load balancing.

Figure 1A:
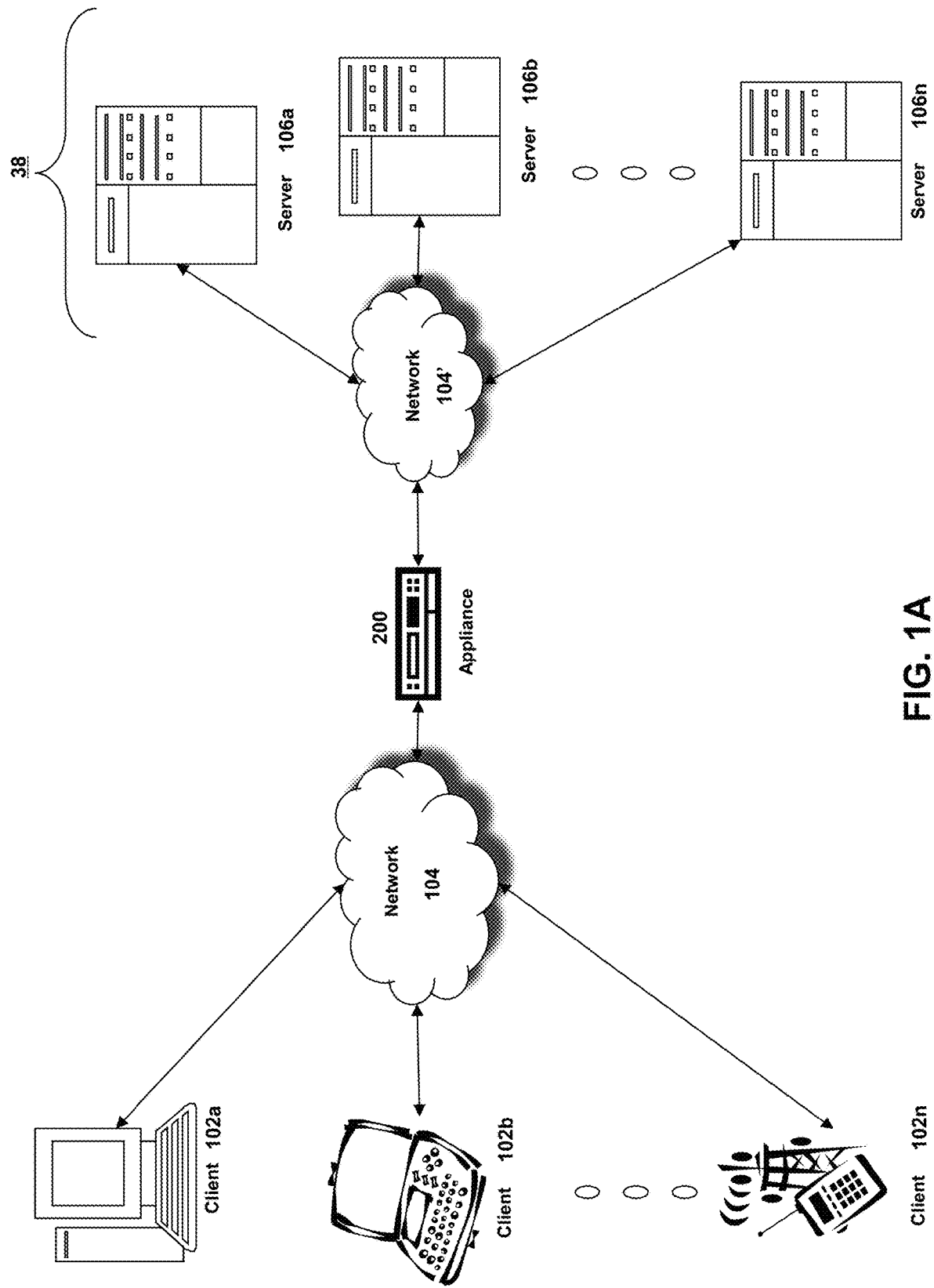
FIG. 1A is a block diagram of an embodiment of a network environment for a client to access a server via an appliance.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for accelerating communications between a client and a server;

Section D describes embodiments of systems and methods for virtualizing an application delivery controller;

Section E describes embodiments of systems and methods for providing a clustered appliance architecture environment; and Section F describes embodiments of systems and methods for detecting a cause of anomalous load balancing among a plurality of servers.

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In some embodiments, the appliance 200 comprises any of the network devices manufactured by Citrix Systems, Inc. of Ft. Lauderdale Fla., referred to as NetScaler® devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
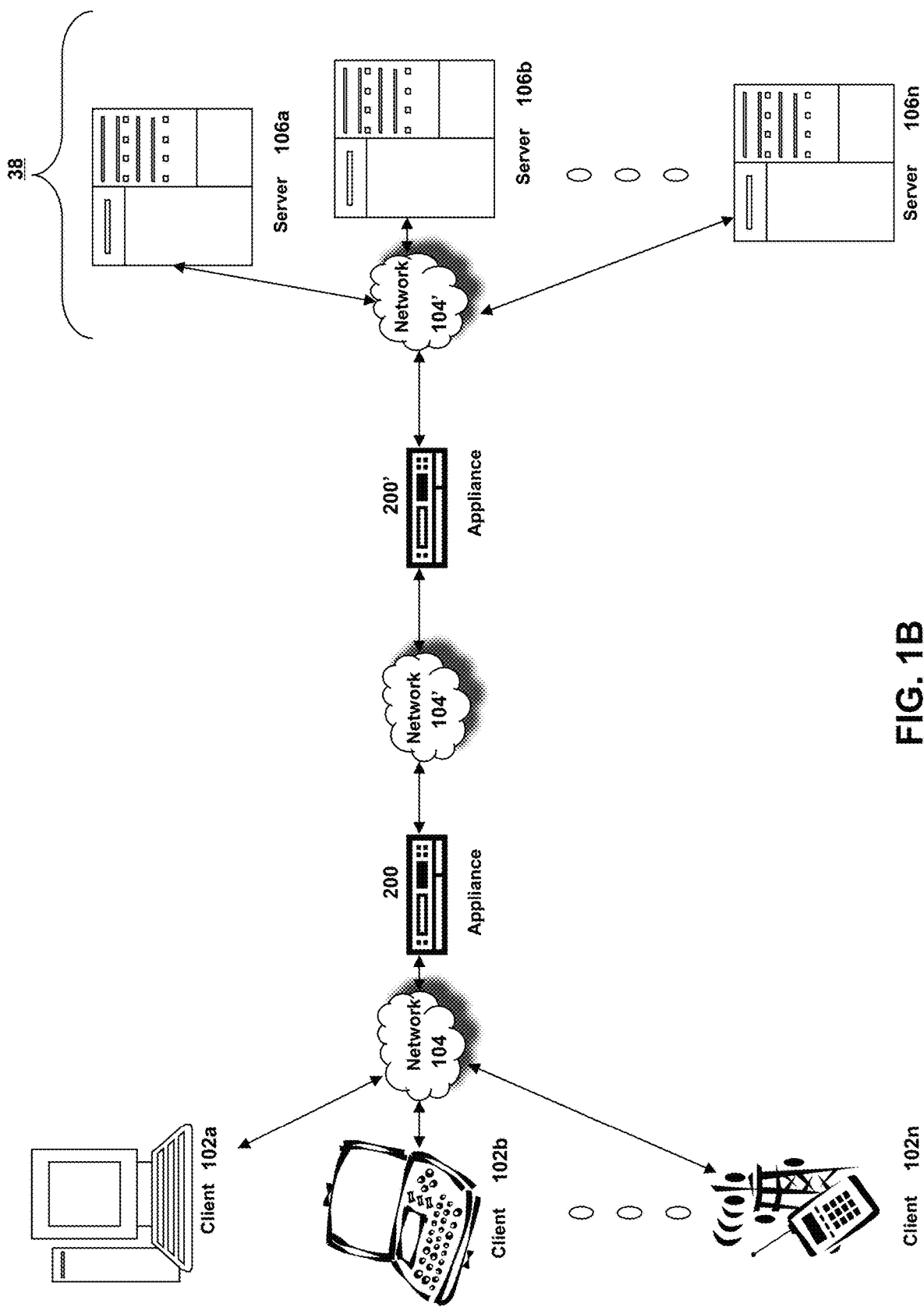
FIG. 1B is a block diagram of an embodiment of an environment for delivering a computing environment from a server to a client via an appliance.

Referring now to FIG. 1B, an embodiment of a network environment deploying multiple appliances 200 is depicted. A first appliance 200 may be deployed on a first network 104 and a second appliance 200' on a second network 104'. For example a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200 may be deployed for a second server farm 38'. In another example, a first appliance 200 may be deployed at a first branch office while the second appliance 200' is deployed at a second branch office'. In some embodiments, the first appliance 200 and second appliance 200' work in cooperation or in conjunction with each other to accelerate network traffic or the delivery of application and data between a client and a server.

Figure 1C:
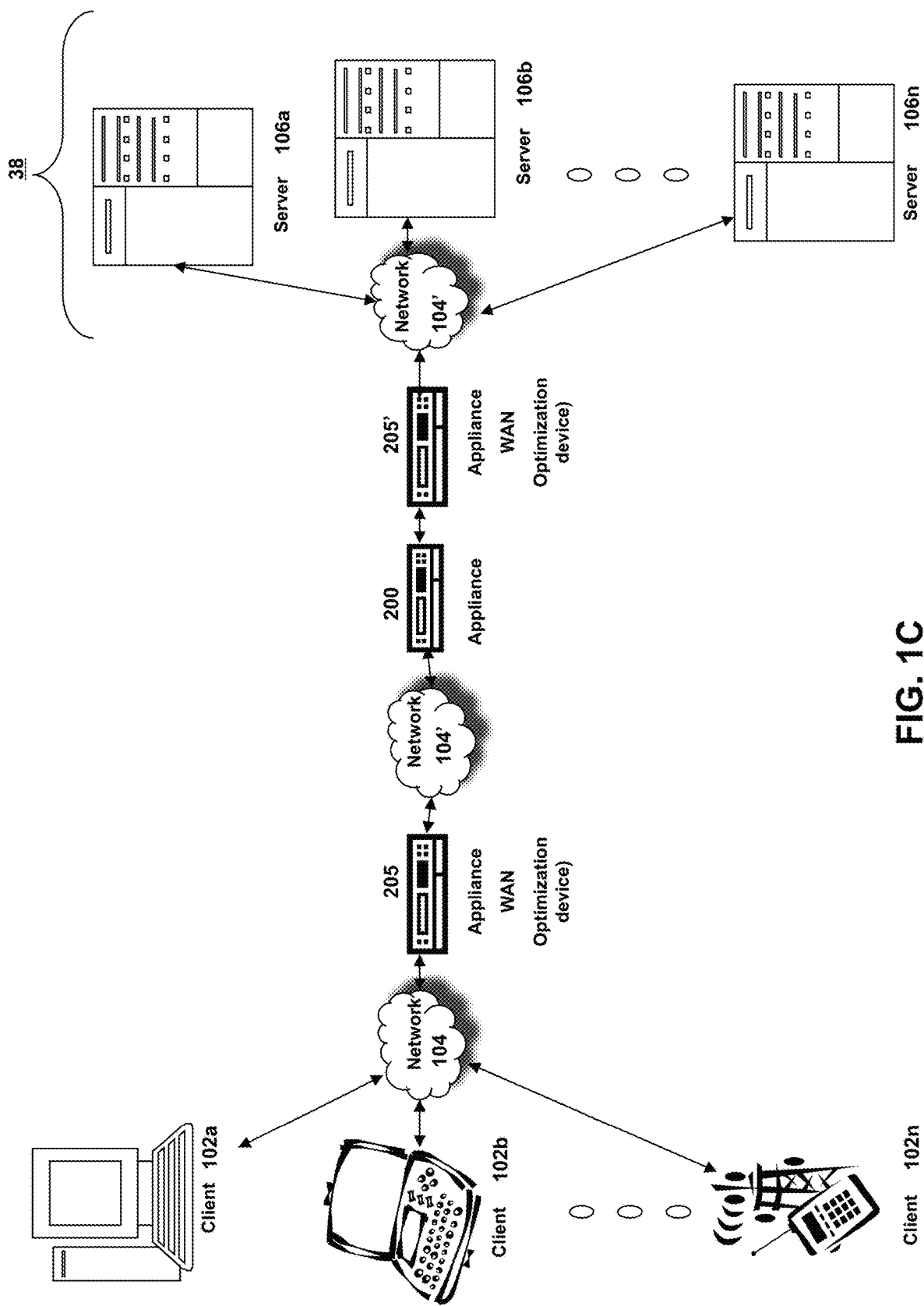
FIG. 1C is a block diagram of another embodiment of an environment for delivering a computing environment from a server to a client via an appliance.

Referring now to FIG. 1C, another embodiment of a network environment deploying the appliance 200 with one or more other types of appliances, such as between one or more WAN optimization appliance 205, 205' is depicted. For example a first WAN optimization appliance 205 is shown between networks 104 and 104' and a second WAN optimization appliance 205' may be deployed between the appliance 200 and one or more servers 106. By way of example, a corporate enterprise may deploy a first WAN optimization appliance 205 at a branch office and a second WAN optimization appliance 205' at a data center. In some embodiments, the appliance 205 may be located on network 104'. In other embodiments, the appliance 205' may be located on network 104. In some embodiments, the appliance 205' may be located on network 104' or network 104". In one embodiment, the appliance 205 and 205' are on the same network. In another embodiment, the appliance 205 and 205' are on different networks. In another example, a first WAN optimization appliance 205 may be deployed for a first server farm 38 and a second WAN optimization appliance 205' for a second server farm 38'.

In one embodiment, the appliance 205 is a device for accelerating, optimizing or otherwise improving the performance, operation, or quality of service of any type and form of network traffic, such as traffic to and/or from a WAN connection. In some embodiments, the appliance 205 is a performance enhancing proxy. In other embodiments, the appliance 205 is any type and form of WAN optimization or acceleration device, sometimes also referred to as a WAN optimization controller. In one embodiment, the appliance 205 is any of the product embodiments referred to as CloudBridge® manufactured by Citrix Systems, Inc. of Ft. Lauderdale, Fl. In other embodiments, the appliance 205 includes any of the product embodiments referred to as BIG-IP link controller and WANjet manufactured by F5 Networks, Inc. of Seattle, Wash. In another embodiment, the appliance 205 includes any of the WX and WXC WAN acceleration device platforms manufactured by Juniper Networks, Inc. of Sunnyvale, Calif. In some embodiments, the appliance 205 includes any of the steelhead line of WAN optimization appliances manufactured by Riverbed Technology of San Francisco, Calif. In other embodiments, the appliance 205 includes any of the WAN related devices manufactured by Expand Networks Inc. of Roseland, N.J. In one embodiment, the appliance 205 includes any of the WAN related appliances manufactured by Packeteer Inc. of Cupertino, Calif., such as the PacketShaper, iShared, and SkyX product embodiments provided by Packeteer. In yet another embodiment, the appliance 205 includes any WAN related appliances and/or software manufactured by Cisco Systems, Inc. of San Jose, Calif., such as the Cisco Wide Area Network Application Services software and network modules, and Wide Area Network engine appliances.

In one embodiment, the appliance 205 provides application and data acceleration services for branch-office or remote offices. In one embodiment, the appliance 205 includes optimization of Wide Area File Services (WAFS). In another embodiment, the appliance 205 accelerates the delivery of files, such as via the Common Internet File System (CIFS) protocol. In other embodiments, the appliance 205 provides caching in memory and/or storage to accelerate delivery of applications and data. In one embodiment, the appliance 205 provides compression of network traffic at any level of the network stack or at any protocol or network layer. In another embodiment, the appliance 205 provides transport layer protocol optimizations, flow control, performance enhancements or modifications and/or management to accelerate delivery of applications and data over a WAN connection. For example, in one embodiment, the appliance 205 provides Transport Control Protocol (TCP) optimizations. In other embodiments, the appliance 205 provides optimizations, flow control, performance enhancements or modifications and/or management for any session or application layer protocol.

In another embodiment, the appliance 205 encoded any type and form of data or information into custom or standard TCP and/or IP header fields or option fields of network packet to announce presence, functionality or capability to another appliance 205'. In another embodiment, an appliance 205' may communicate with another appliance 205' using data encoded in both TCP and/or IP header fields or options. For example, the appliance may use TCP option(s) or IP header fields or options to communicate one or more parameters to be used by the appliances 205, 205' in performing functionality, such as WAN acceleration, or for working in conjunction with each other.

In some embodiments, the appliance 200 preserves any of the information encoded in TCP and/or IP header and/or option fields communicated between appliances 205 and 205'. For example, the appliance 200 may terminate a transport layer connection traversing the appliance 200, such as a transport layer connection from between a client and a server traversing appliances 205 and 205'. In one embodiment, the appliance 200 identifies and preserves any encoded information in a transport layer packet transmitted by a first appliance 205 via a first transport layer connection and communicates a transport layer packet with the encoded information to a second appliance 205' via a second transport layer connection.

Figure 1D:
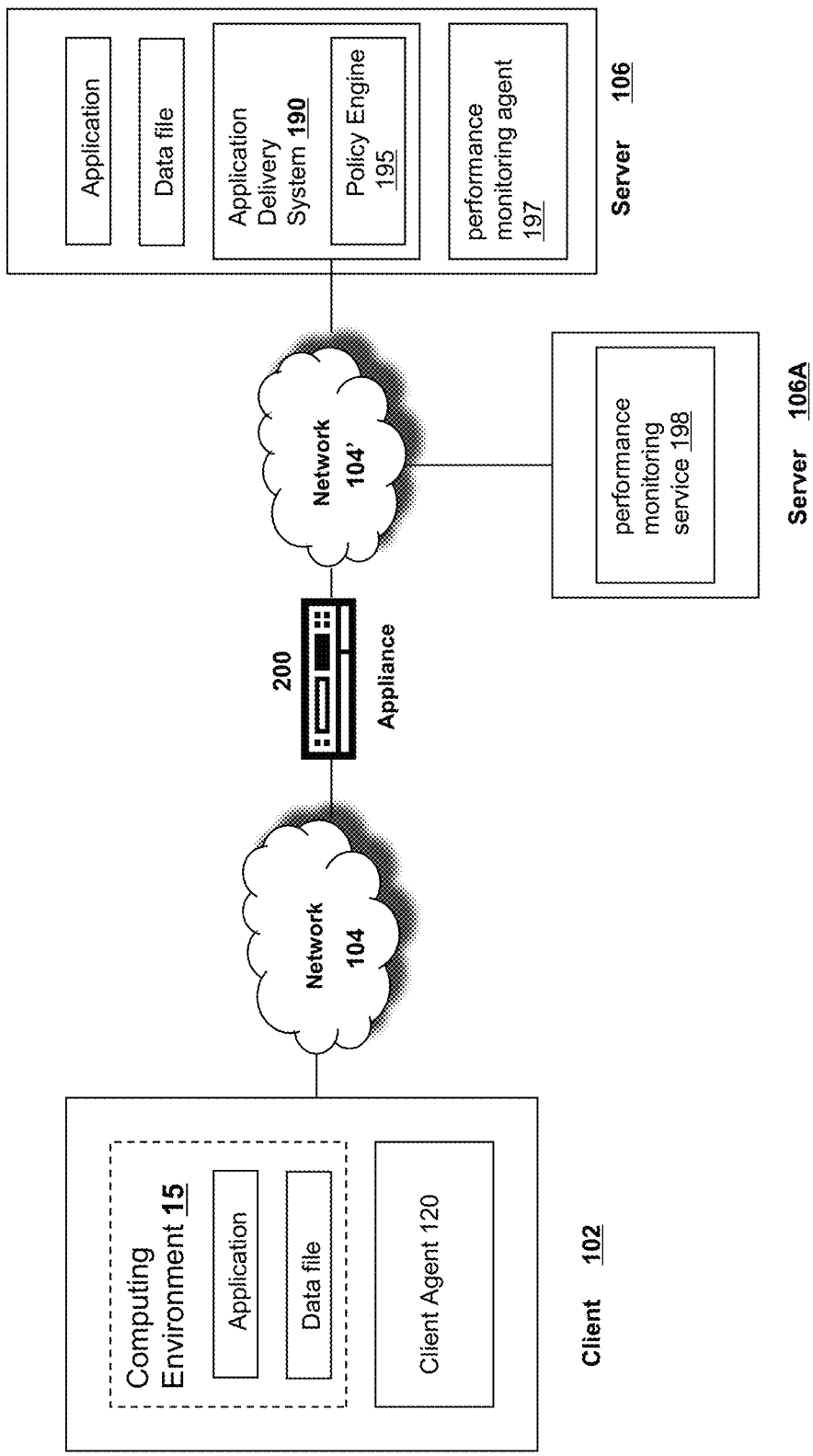
FIG. 1D is a block diagram of another embodiment of an environment for delivering a computing environment from a server to a client via an appliance.

Referring now to FIG. 1D, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Workspace Suite™ by Citrix Systems, Inc., such as XenApp® or XenDesktop® and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Workspace Suite™ by Citrix Systems, Inc., such as XenApp® or XenDesktop®, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Systems, Inc. of Fort Lauderdale, Fla., WebEx™ provided by Cisco Systems, Inc. of San Jose, Calif., or Microsoft Office Live Meeting provided by Microsoft Corporation of Redmond, Wash.

Still referring to FIG. 1D, an embodiment of the network environment may include a monitoring server 106A. The monitoring server 106A may include any type and form performance monitoring service 198. The performance monitoring service 198 may include monitoring, measurement and/or management software and/or hardware, including data collection, aggregation, analysis, management and reporting. In one embodiment, the performance monitoring service 198 includes one or more monitoring agents 197. The monitoring agent 197 includes any software, hardware or combination thereof for performing monitoring, measurement and data collection activities on a device, such as a client 102, server 106 or an appliance 200, 205. In some embodiments, the monitoring agent 197 includes any type and form of script, such as Visual Basic script, or Javascript. In one embodiment, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In one embodiment, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, appliance 200, appliance 205, or network connection. In one embodiment, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In one embodiment, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any .NET or J2EE calls. In one embodiment, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In one embodiment, the monitoring service 198 and/or monitoring agent 197 performs monitoring and performance measurement of a delivery of application and/or data from a server to a client via one or more appliances, such as appliance 200 and/or appliance 205. In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In one embodiment, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiments, the monitoring service 198 and/or monitoring agent 197 measures and monitors the time required to log-in to an application, a server, or the application delivery system, such as Citrix Presentation Server. In one embodiment, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and monitors measures and monitors any type and form of server metrics. In one embodiment, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif. In one embodiment, the performance monitoring service 198 and/ or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Tex.

Figure 1E:
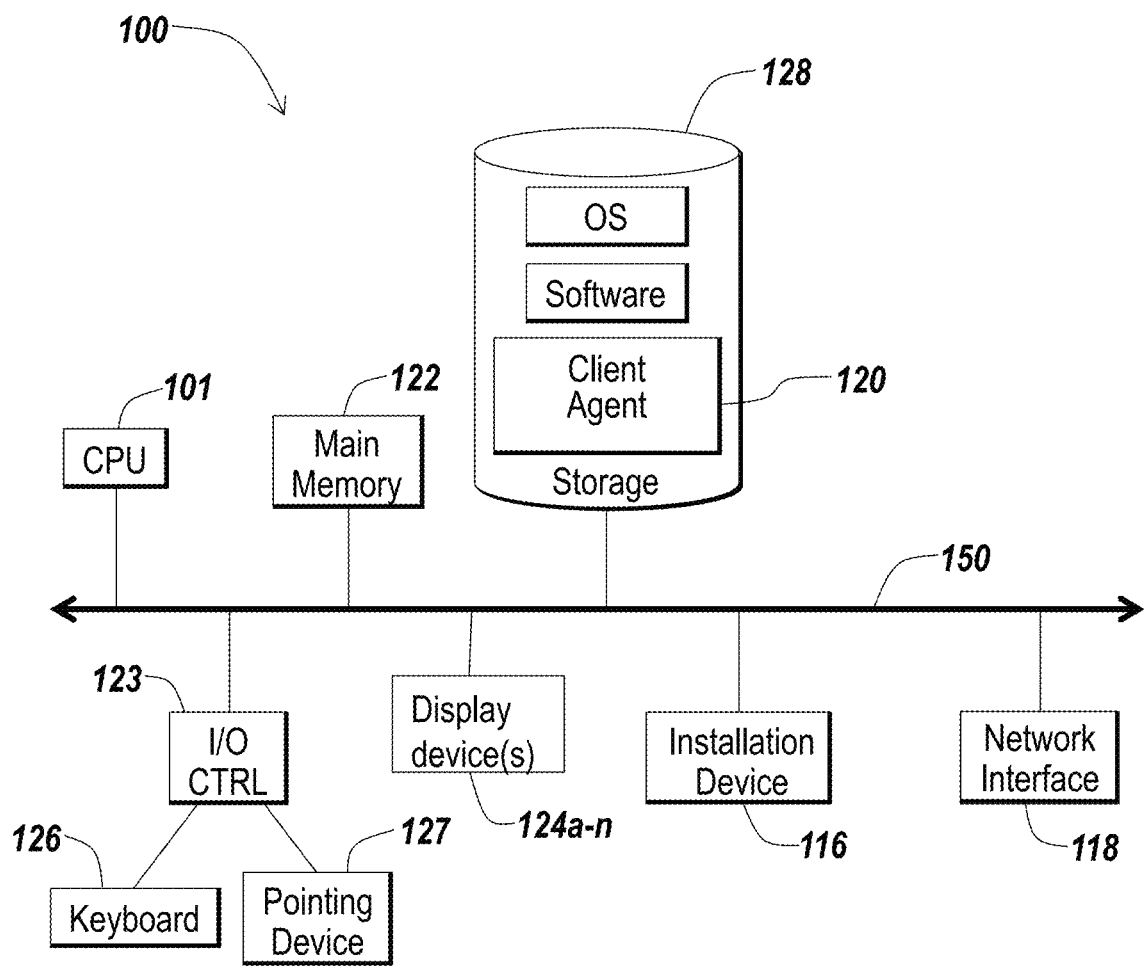
FIGS. 1E-1H are block diagrams of embodiments of a computing device.
Figure 1F:
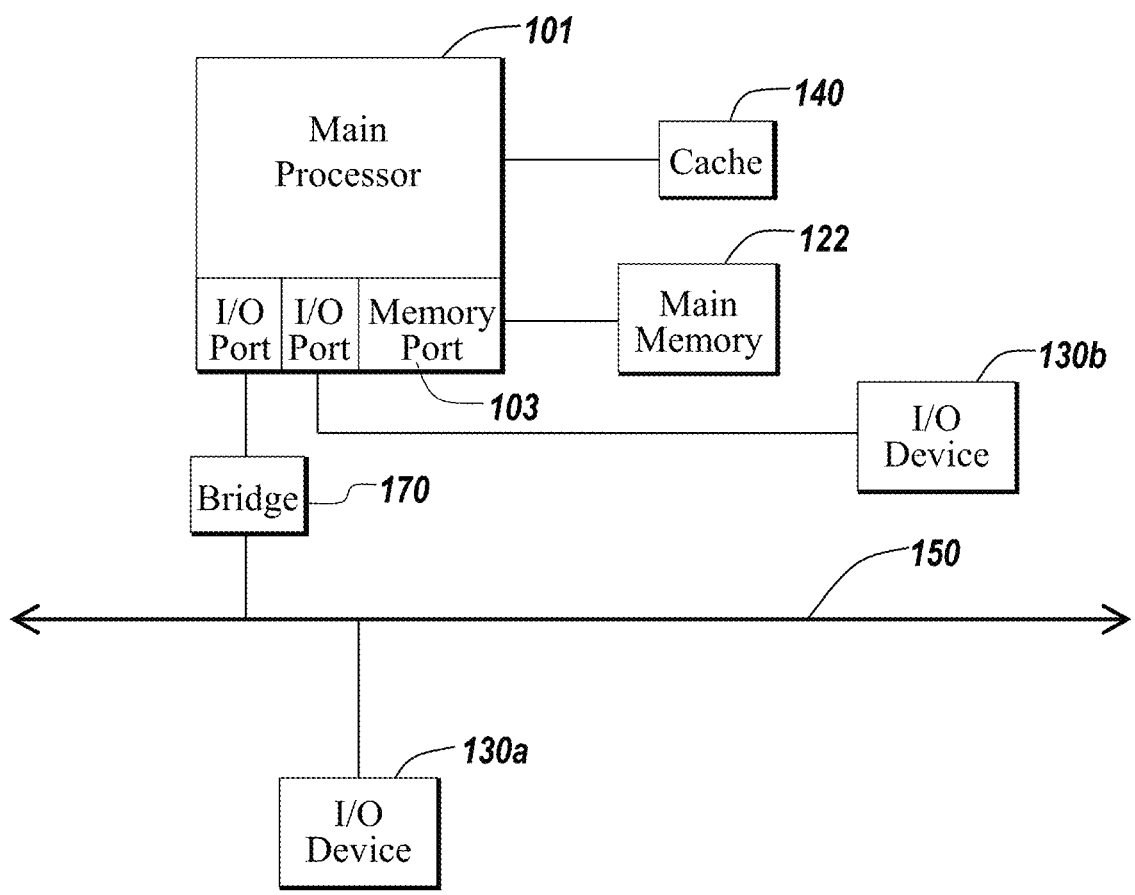

The client 102, server 106, and appliance 200 may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130*a*-130*b* (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1F depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150.

Cache memory 140 typically has a faster response time than main memory 122 and is typically provided by SRAM, BSRAM, or EDRAM. In the embodiment shown in FIG. 1F, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1F depicts an embodiment of a computer 100 in which the main processor 101 communicates directly with I/O device 130b via HyperTransport, Rapid I/O, or InfiniBand. FIG. 1F also depicts an embodiment in which local busses and direct communication are mixed: the processor 101 communicates with I/O device 130b using a local interconnect bus while communicating with I/O device 130a directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a UNIX operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 1G:
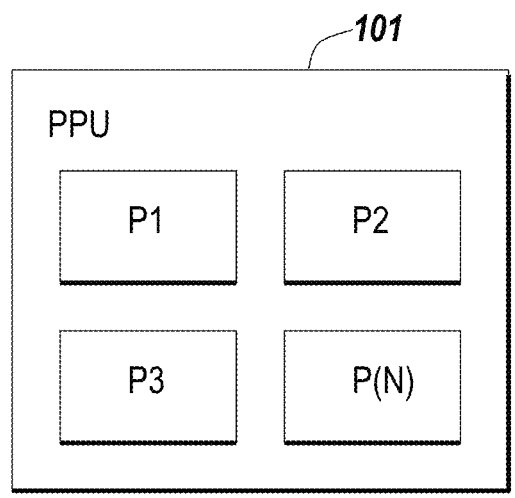

As shown in FIG. 1G, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multi-core microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1H:
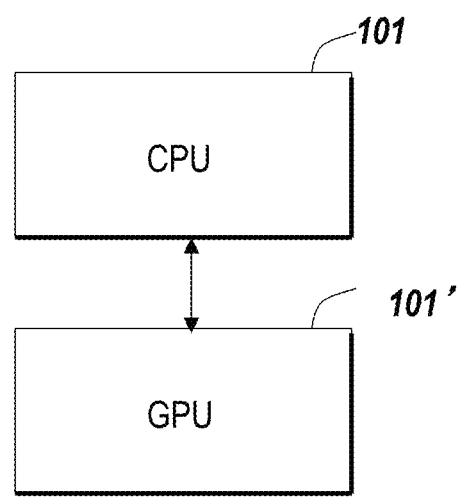

In some embodiments, the computing device 100 may comprise a graphics processing unit. In one of these embodiments depicted in FIG. 1H, the computing device 100 includes at least one central processing unit 101 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In some embodiments, a first computing device 100a executes an application on behalf of a user of a client computing device 100b. In other embodiments, a computing device 100a executes a virtual machine, which provides an execution session within which applications execute on behalf of a user or a client computing devices 100b. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

B. Appliance Architecture

Figure 2A:
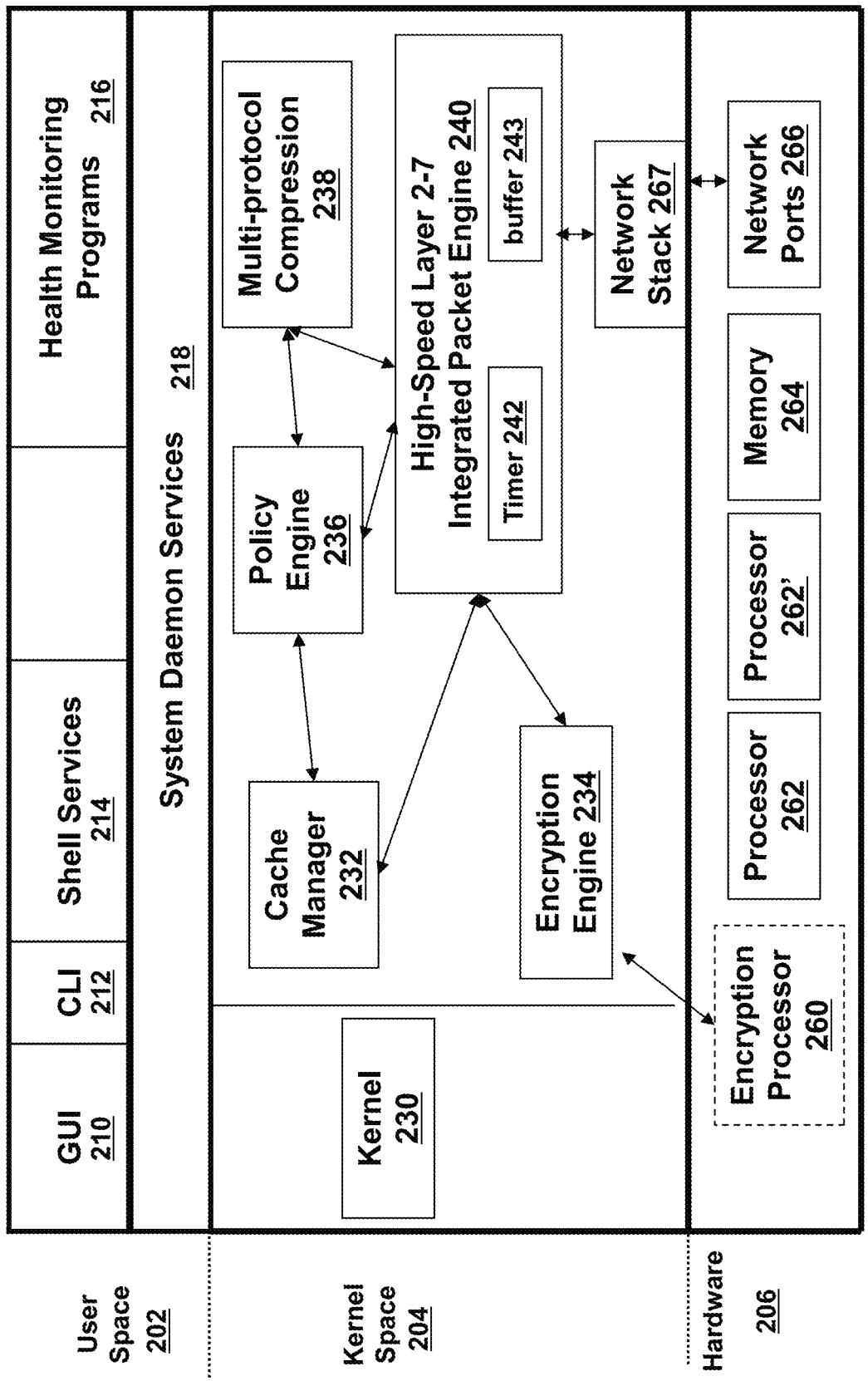
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of UNIX operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element may comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identify, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packet. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200. The GUI 210 or CLI 212 can comprise code running in user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
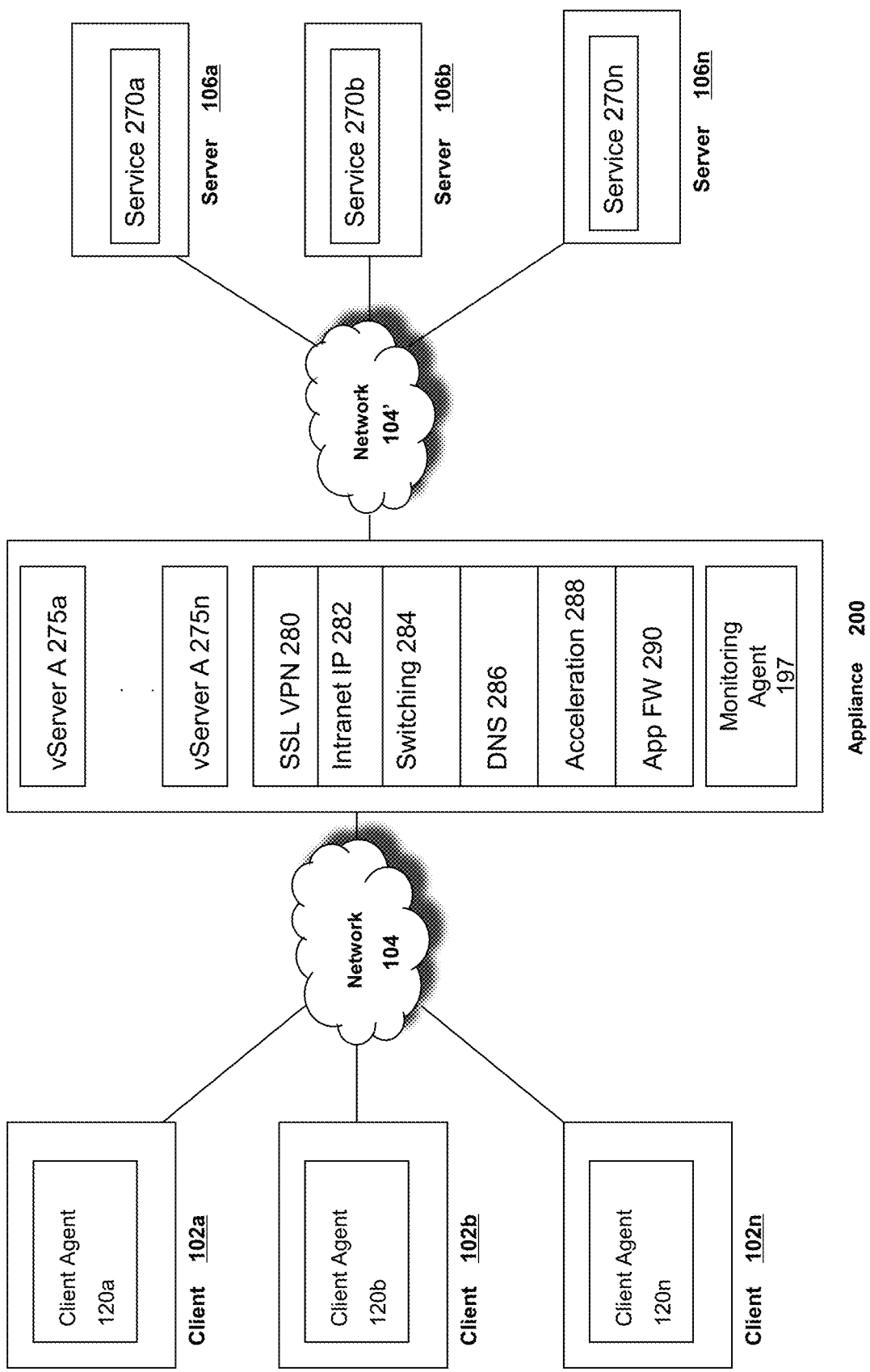
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a vServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 102 In one embodiment, the appliance 200 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or IntranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP address 282, which is a network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching.

In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement numbers expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

Still referring to FIG. 2B, the appliance 200 may include a performance monitoring agent 197 as discussed above in conjunction with FIG. 1D. In one embodiment, the appliance 200 receives the monitoring agent 197 from the monitoring service 198 or monitoring server 106 as depicted in FIG. 1D. In some embodiments, the appliance 200 stores the monitoring agent 197 in storage, such as disk, for delivery to any client or server in communication with the appliance 200. For example, in one embodiment, the appliance 200 transmits the monitoring agent 197 to a client upon receiving a request to establish a transport layer connection. In other embodiments, the appliance 200 transmits the monitoring agent 197 upon establishing the transport layer connection with the client 102. In another embodiment, the appliance 200 transmits the monitoring agent 197 to the client upon intercepting or detecting a request for a web page. In yet another embodiment, the appliance 200 transmits the monitoring agent 197 to a client or a server in response to a request from the monitoring server 198. In one embodiment, the appliance 200 transmits the monitoring agent 197 to a second appliance 200' or appliance 205.

In other embodiments, the appliance 200 executes the monitoring agent 197. In one embodiment, the monitoring agent 197 measures and monitors the performance of any application, program, process, service, task or thread executing on the appliance 200. For example, the monitoring agent 197 may monitor and measure performance and operation of vServers 275A-275N. In another embodiment, the monitoring agent 197 measures and monitors the performance of any transport layer connections of the appliance 200. In some embodiments, the monitoring agent 197 measures and monitors the performance of any user sessions traversing the appliance 200. In one embodiment, the monitoring agent 197 measures and monitors the performance of any virtual private network connections and/or sessions traversing the appliance 200, such an SSL VPN session. In still further embodiments, the monitoring agent 197 measures and monitors the memory, CPU and disk usage and performance of the appliance 200. In yet another embodiment, the monitoring agent 197 measures and monitors the performance of any acceleration technique 288 performed by the appliance 200, such as SSL offloading, connection pooling and multiplexing, caching, and compression. In some embodiments, the monitoring agent 197 measures and monitors the performance of any load balancing and/or content switching 284 performed by the appliance 200. In other embodiments, the monitoring agent 197 measures and monitors the performance of application firewall 290 protection and processing performed by the appliance 200.

C. Client Agent

Figure 3:
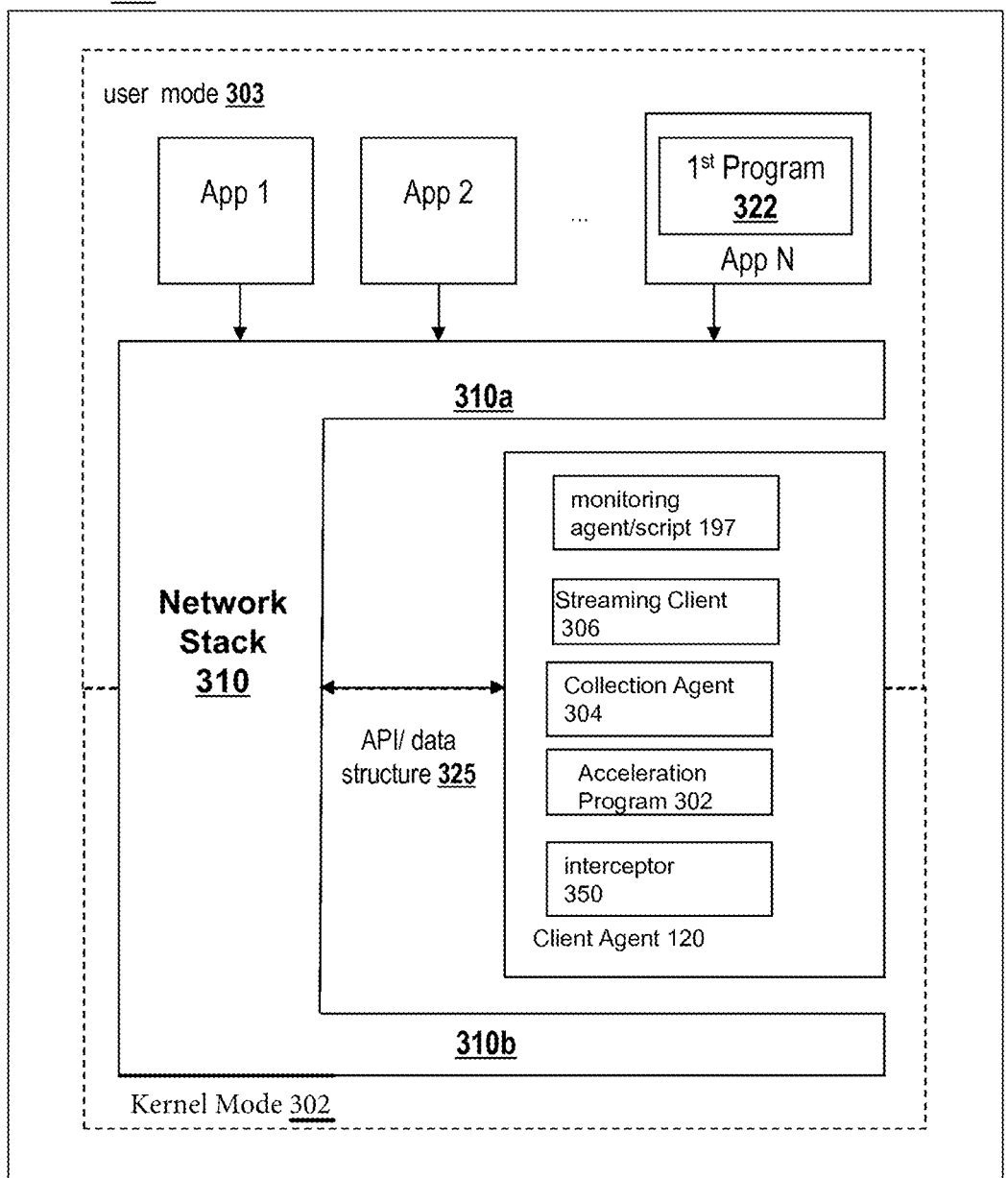
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 302 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a mini-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, a collection agent 304, and/or monitoring agent 197. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol.

The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system and/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments, the client agent 120 includes a monitoring agent 197 as discussed in conjunction with FIGS. 1D and 2B. The monitoring agent 197 may be any type and form of script, such as Visual Basic or Java script. In one embodiment, the monitoring agent 197 monitors and measures performance of any portion of the client agent 120. For example, in some embodiments, the monitoring agent 197 monitors and measures performance of the acceleration program 302. In another embodiment, the monitoring agent 197 monitors and measures performance of the streaming client 306. In other embodiments, the monitoring agent 197 monitors and measures performance of the collection agent 304. In still another embodiment, the monitoring agent 197 monitors and measures performance of the interceptor 350. In some embodiments, the monitoring agent 197 monitors and measures any resource of the client 102, such as memory, CPU and disk.

The monitoring agent 197 may monitor and measure performance of any application of the client. In one embodiment, the monitoring agent 197 monitors and measures performance of a browser on the client 102. In some embodiments, the monitoring agent 197 monitors and measures performance of any application delivered via the client agent 120. In other embodiments, the monitoring agent 197 measures and monitors end user response times for an application, such as web-based or HTTP response times. The monitoring agent 197 may monitor and measure performance of an ICA or RDP client. In another embodiment, the monitoring agent 197 measures and monitors metrics for a user session or application session. In some embodiments, monitoring agent 197 measures and monitors an ICA or RDP session. In one embodiment, the monitoring agent 197 measures and monitors the performance of the appliance 200 in accelerating delivery of an application and/or data to the client 102.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

Figure 4A:
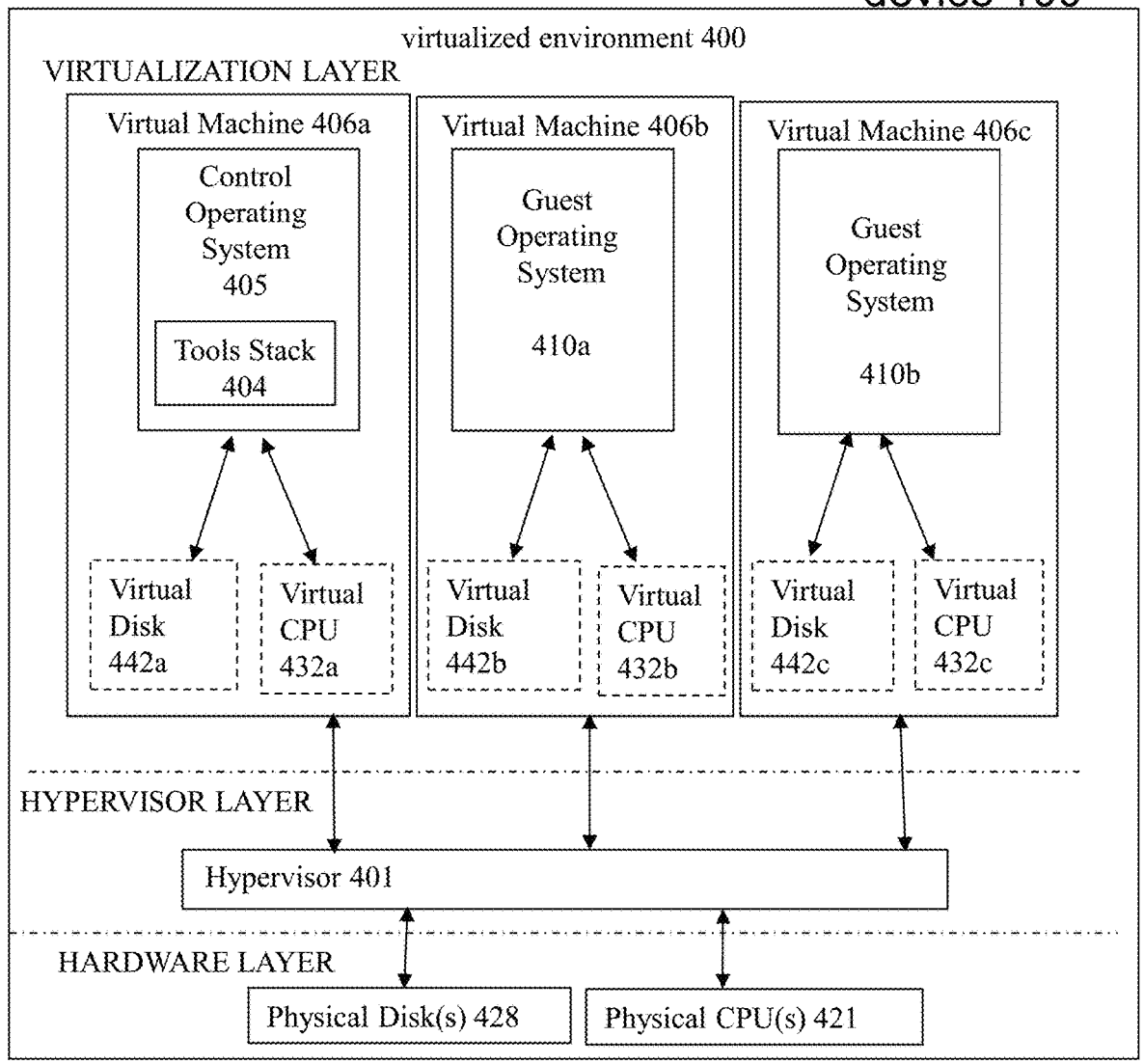
FIG. 4A is a block diagram of an embodiment of a virtualization environment.

D. Systems and Methods for Providing Virtualized Application Delivery Controller Referring now to FIG. 4A, a block diagram depicts one embodiment of a virtualization environment 400. In brief overview, a computing device 100 includes a hypervisor layer, a virtualization layer, and a hardware layer. The hypervisor layer includes a hypervisor 401 (also referred to as a virtualization manager) that allocates and manages access to a number of physical resources in the hardware layer (e.g., the processor(s) 421, and disk(s) 428) by at least one virtual machine executing in the virtualization layer. The virtualization layer includes at least one operating system 410 and a plurality of virtual resources allocated to the at least one operating system 410. Virtual resources may include, without limitation, a plurality of virtual processors 432a, 432b, 432c (generally 432), and virtual disks 442a, 442b, 442c (generally 442), as well as virtual resources such as virtual memory and virtual network interfaces. The plurality of virtual resources and the operating system 410 may be referred to as a virtual machine 406. A virtual machine 406 may include a control operating system 405 in communication with the hypervisor 401 and used to execute applications for managing and configuring other virtual machines on the computing device 100.

In greater detail, a hypervisor 401 may provide virtual resources to an operating system in any manner which simulates the operating system having access to a physical device. A hypervisor 401 may provide virtual resources to any number of guest operating systems 410a, 410b (generally 410). In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 100 executing a hypervisor that creates a virtual machine platform on which guest operating systems may execute is referred to as a host server. In one of these embodiments, for example, the computing device 100 is a XEN SERVER provided by Citrix Systems, Inc., of Fort Lauderdale, Fla.

In some embodiments, a hypervisor 401 executes within an operating system executing on a computing device. In one of these embodiments, a computing device executing an operating system and a hypervisor 401 may be said to have a host operating system (the operating system executing on the computing device), and a guest operating system (an operating system executing within a computing resource partition provided by the hypervisor 401). In other embodiments, a hypervisor 401 interacts directly with hardware on a computing device, instead of executing on a host operating system. In one of these embodiments, the hypervisor 401 may be said to be executing on "bare metal," referring to the hardware comprising the computing device.

In some embodiments, a hypervisor 401 may create a virtual machine 406a-c (generally 406) in which an operating system 410 executes. In one of these embodiments, for example, the hypervisor 401 loads a virtual machine image to create a virtual machine 406. In another of these embodiments, the hypervisor 401 executes an operating system 410 within the virtual machine 406. In still another of these embodiments, the virtual machine 406 executes an operating system 410.

In some embodiments, the hypervisor 401 controls processor scheduling and memory partitioning for a virtual machine 406 executing on the computing device 100. In one of these embodiments, the hypervisor 401 controls the execution of at least one virtual machine 406. In another of these embodiments, the hypervisor 401 presents at least one virtual machine 406 with an abstraction of at least one hardware resource provided by the computing device 100. In other embodiments, the hypervisor 401 controls whether and how physical processor capabilities are presented to the virtual machine 406.

A control operating system 405 may execute at least one application for managing and configuring the guest operating systems. In one embodiment, the control operating system 405 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 401 executes the control operating system 405 within a virtual machine 406 created by the hypervisor 401. In still another embodiment, the control operating system 405 executes in a virtual machine 406 that is authorized to directly access physical resources on the computing device 100. In some embodiments, a control operating system 405a on a computing device 100a may exchange data with a control operating system 405b on a computing device 100b, via communications between a hypervisor 401a and a hypervisor 401b. In this way, one or more computing devices 100 may exchange data with one or more of the other computing devices 100 regarding processors and other physical resources available in a pool of resources. In one of these embodiments, this functionality allows a hypervisor to manage a pool of resources distributed across a plurality of physical computing devices. In another of these embodiments, multiple hypervisors manage one or more of the guest operating systems executed on one of the computing devices 100.

In one embodiment, the control operating system 405 executes in a virtual machine 406 that is authorized to interact with at least one guest operating system 410. In another embodiment, a guest operating system 410 communicates with the control operating system 405 via the hypervisor 401 in order to request access to a disk or a network. In still another embodiment, the guest operating system 410 and the control operating system 405 may communicate via a communication channel established by the hypervisor 401, such as, for example, via a plurality of shared memory pages made available by the hypervisor 401.

In some embodiments, the control operating system 405 includes a network back-end driver for communicating directly with networking hardware provided by the computing device 100. In one of these embodiments, the network back-end driver processes at least one virtual machine request from at least one guest operating system 110. In other embodiments, the control operating system 405 includes a block back-end driver for communicating with a storage element on the computing device 100. In one of these embodiments, the block back-end driver reads and writes data from the storage element based upon at least one request received from a guest operating system 410.

In one embodiment, the control operating system 405 includes a tools stack 404. In another embodiment, a tools stack 404 provides functionality for interacting with the hypervisor 401, communicating with other control operating systems 405 (for example, on a second computing device 100b), or managing virtual machines 406b, 406c on the computing device 100. In another embodiment, the tools stack 404 includes customized applications for providing improved management functionality to an administrator of a virtual machine farm. In some embodiments, at least one of the tools stack 404 and the control operating system 405 include a management API that provides an interface for remotely configuring and controlling virtual machines 406 running on a computing device 100. In other embodiments, the control operating system 405 communicates with the hypervisor 401 through the tools stack 404.

In one embodiment, the hypervisor 401 executes a guest operating system 410 within a virtual machine 406 created by the hypervisor 401. In another embodiment, the guest operating system 410 provides a user of the computing device 100 with access to resources within a computing environment. In still another embodiment, a resource includes a program, an application, a document, a file, a plurality of applications, a plurality of files, an executable program file, a desktop environment, a computing environment, or other resource made available to a user of the computing device 100. In yet another embodiment, the resource may be delivered to the computing device 100 via a plurality of access methods including, but not limited to, conventional installation directly on the computing device 100, delivery to the computing device 100 via a method for application streaming, delivery to the computing device 100 of output data generated by an execution of the resource on a second computing device 100' and communicated to the computing device 100 via a presentation layer protocol, delivery to the computing device 100 of output data generated by an execution of the resource via a virtual machine executing on a second computing device 100', or execution from a removable storage device connected to the computing device 100, such as a USB device, or via a virtual machine executing on the computing device 100 and generating output data. In some embodiments, the computing device 100 transmits output data generated by the execution of the resource to another computing device 100'.

In one embodiment, the guest operating system 410, in conjunction with the virtual machine on which it executes, forms a fully-virtualized virtual machine which is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 401. In such an embodiment, the driver may be aware that it executes within a virtualized environment. In another embodiment, the guest operating system 410, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control operating system 405, as described above.

Figure 4B:
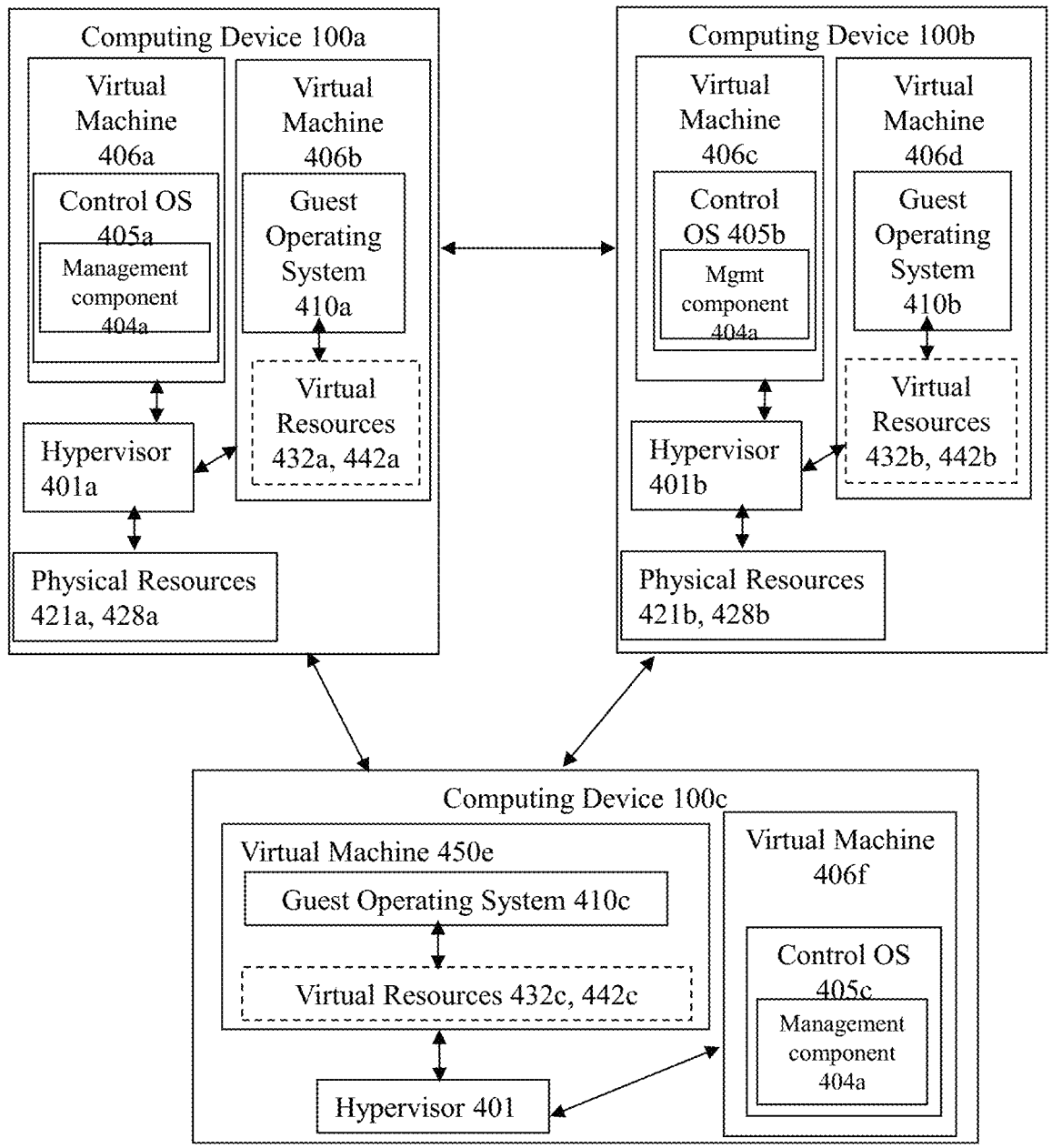
FIG. 4B is a block diagram of another embodiment of a virtualization environment.

Referring now to FIG. 4B, a block diagram depicts one embodiment of a plurality of networked computing devices in a system in which at least one physical host executes a virtual machine. In brief overview, the system includes a management component 404 and a hypervisor 401. The system includes a plurality of computing devices 100, a plurality of virtual machines 406, a plurality of hypervisors 401, a plurality of management components referred to variously as tools stacks 404 or management components 404, and a physical resource 421, 428. The plurality of physical machines 100 may each be provided as computing devices 100, described above in connection with FIGS. 1E-1H and 4A.

In greater detail, a physical disk 428 is provided by a computing device 100 and stores at least a portion of a virtual disk 442. In some embodiments, a virtual disk 442 is associated with a plurality of physical disks 428. In one of these embodiments, one or more computing devices 100 may exchange data with one or more of the other computing devices 100 regarding processors and other physical resources available in a pool of resources, allowing a hypervisor to manage a pool of resources distributed across a plurality of physical computing devices. In some embodiments, a computing device 100 on which a virtual machine 406 executes is referred to as a physical host 100 or as a host machine 100.

The hypervisor executes on a processor on the computing device 100. The hypervisor allocates, to a virtual disk, an amount of access to the physical disk. In one embodiment, the hypervisor 401 allocates an amount of space on the physical disk. In another embodiment, the hypervisor 401 allocates a plurality of pages on the physical disk. In some embodiments, the hypervisor provisions the virtual disk 442 as part of a process of initializing and executing a virtual machine 450.

In one embodiment, the management component 404a is referred to as a pool management component 404a. In another embodiment, a management operating system 405a, which may be referred to as a control operating system 405a, includes the management component. In some embodiments, the management component is referred to as a tools stack. In one of these embodiments, the management component is the tools stack 404 described above in connection with FIG. 4A. In other embodiments, the management component 404 provides a user interface for receiving, from a user such as an administrator, an identification of a virtual machine 406 to provision and/or execute. In still other embodiments, the management component 404 provides a user interface for receiving, from a user such as an administrator, the request for migration of a virtual machine 406b from one physical machine 100 to another. In further embodiments, the management component 404a identifies a computing device 100b on which to execute a requested virtual machine 406d and instructs the hypervisor 401b on the identified computing device 100b to execute the identified virtual machine; such a management component may be referred to as a pool management component.

Figure 4C:
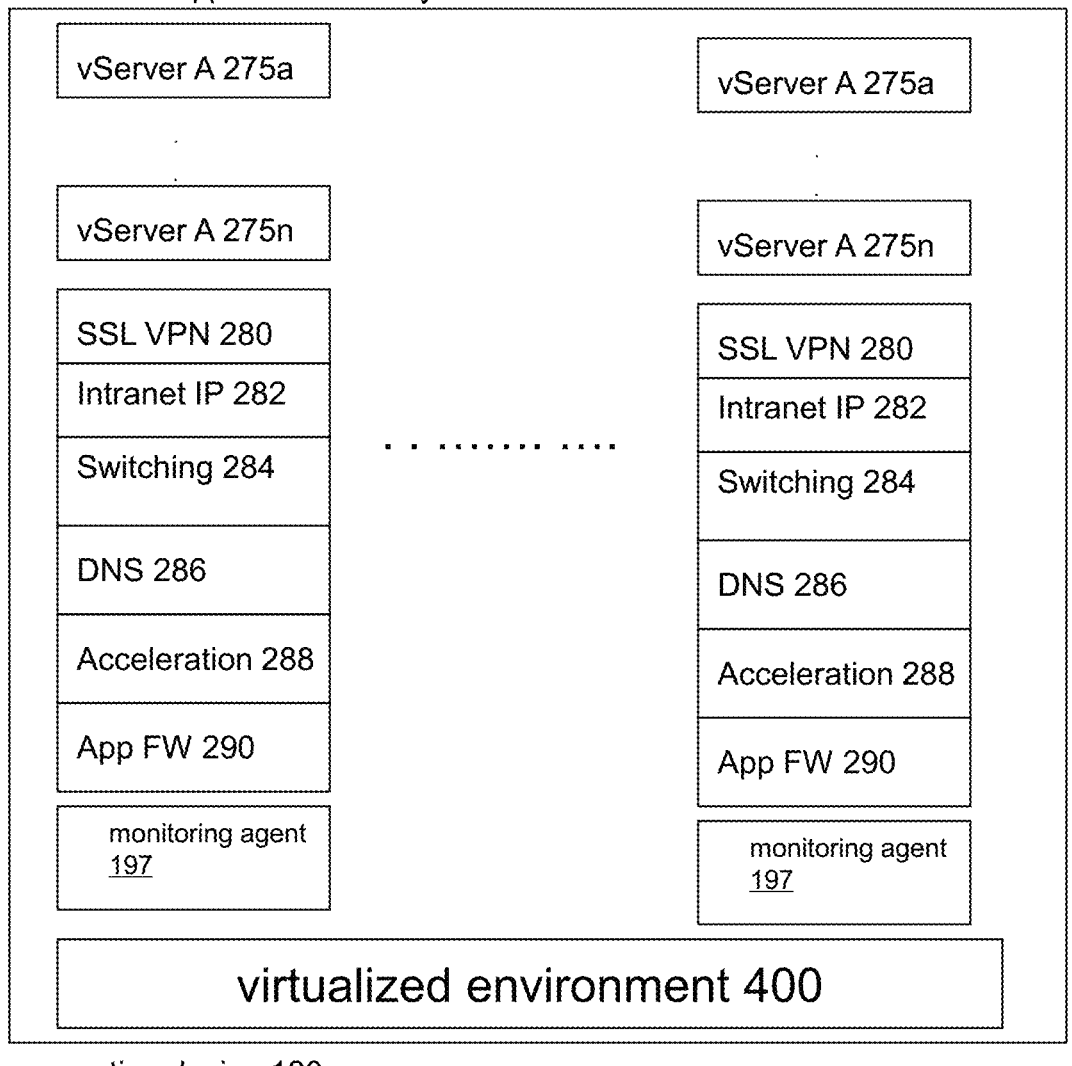
FIG. 4C is a block diagram of an embodiment of a virtualized appliance.

Referring now to FIG. 4C, embodiments of a virtual application delivery controller or virtual appliance 450 are depicted. In brief overview, any of the functionality and/or embodiments of the appliance 200 (e.g., an application delivery controller) described above in connection with FIGS. 2A and 2B may be deployed in any embodiment of the virtualized environment described above in connection with FIGS. 4A and 4B. Instead of the functionality of the application delivery controller being deployed in the form of an appliance 200, such functionality may be deployed in a virtualized environment 400 on any computing device 100, such as a client 102, server 106 or appliance 200.

Referring now to FIG. 4C, a diagram of an embodiment of a virtual appliance 450 operating on a hypervisor 401 of a server 106 is depicted. As with the appliance 200 of FIGS. 2A and 2B, the virtual appliance 450 may provide functionality for availability, performance, offload and security. For availability, the virtual appliance may perform load balancing between layers 4 and 7 of the network and may also perform intelligent service health monitoring. For performance increases via network traffic acceleration, the virtual appliance may perform caching and compression. To offload processing of any servers, the virtual appliance may perform connection multiplexing and pooling and/or SSL processing. For security, the virtual appliance may perform any of the application firewall functionality and SSL VPN function of appliance 200.

Any of the modules of the appliance 200 as described in connection with FIG. 2A may be packaged, combined, designed or constructed in a form of the virtualized appliance delivery controller 450 deployable as one or more software modules or components executable in a virtualized environment 300 or non-virtualized environment on any server, such as an off the shelf server. For example, the virtual appliance may be provided in the form of an installation package to install on a computing device. With reference to FIG. 2A, any of the cache manager 232, policy engine 236, compression 238, encryption engine 234, packet engine 240, GUI 210, CLI 212, shell services 214 and health monitoring programs 216 may be designed and constructed as a software component or module to run on any operating system of a computing device and/or of a virtualized environment 300. Instead of using the encryption processor 260, processor 262, memory 264 and network stack 267 of the appliance 200, the virtualized appliance 400 may use any of these resources as provided by the virtualized environment 400 or as otherwise available on the server 106.

Still referring to FIG. 4C, and in brief overview, any one or more vServers 275A-275N may be in operation or executed in a virtualized environment 400 of any type of computing device 100, such as any server 106. Any of the modules or functionality of the appliance 200 described in connection with FIG. 2B may be designed and constructed to operate in either a virtualized or non-virtualized environment of a server. Any of the vServer 275, SSL VPN 280, Intranet UP 282, Switching 284, DNS 286, acceleration 288, App FW 290 and monitoring agent may be packaged, combined, designed or constructed in a form of application delivery controller 450 deployable as one or more software modules or components executable on a device and/or virtualized environment 400.

In some embodiments, a server may execute multiple virtual machines 406a-406n in the virtualization environment with each virtual machine running the same or different embodiments of the virtual application delivery controller 450. In some embodiments, the server may execute one or more virtual appliances 450 on one or more virtual machines on a core of a multi-core processing system. In some embodiments, the server may execute one or more virtual appliances 450 on one or more virtual machines on each processor of a multiple processor device.

E. Systems and Methods for Providing a Distributed Cluster Architecture

To overcome limitations on transistor spacing and CPU speed increases, many CPU manufacturers have incorporated multi-core CPUs to improve performance beyond that capable of even a single, higher speed CPU. Similar or further performance gains may be made by operating a plurality of appliances, either single or multi-core, together as a distributed or clustered appliance. Individual computing devices or appliances may be referred to as nodes of the cluster. A centralized management system may perform load balancing, distribution, configuration, or other tasks to allow the nodes to operate in conjunction as a single computing system. Externally or to other devices, including servers and clients, in many embodiments, the cluster may be viewed as a single virtual appliance or computing device, albeit one with performance exceeding that of a typical individual appliance.

Figure 5:
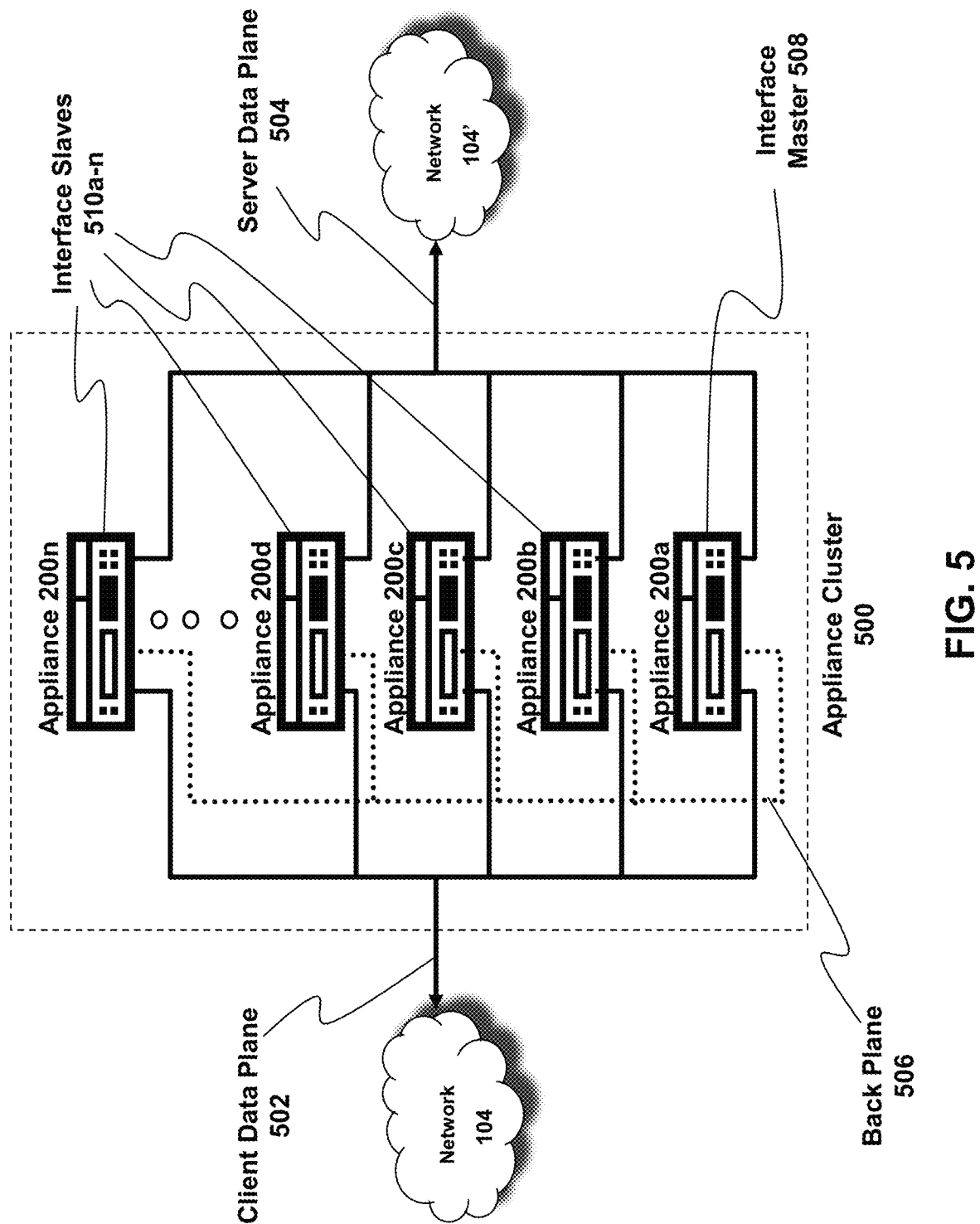
FIG. 5 is a block diagram of an embodiment of a cluster system.

Referring now to FIG. 5, illustrated is an embodiment of a computing device cluster or appliance cluster 500. A plurality of appliances 200a-200n or other computing devices, sometimes referred to as nodes, such as desktop computers, servers, rack mount servers, blade servers, or any other type and form of computing device may be joined into a single appliance cluster 500. Although referred to as an appliance cluster, in many embodiments, the cluster may operate as an application server, network storage server, backup service, or any other type of computing device without limitation. In many embodiments, the appliance cluster 500 may be used to perform many of the functions of appliances 200, WAN optimization devices, network acceleration devices, or other devices discussed above.

In some embodiments, the appliance cluster 500 may comprise a homogenous set of computing devices, such as identical appliances, blade servers within one or more chassis, desktop or rack mount computing devices, or other devices. In other embodiments, the appliance cluster 500 may comprise a heterogeneous or mixed set of devices, including different models of appliances, mixed appliances and servers, or any other set of computing devices. This may allow for an appliance cluster 500 to be expanded or upgraded over time with new models or devices, for example.

In some embodiments, each computing device or appliance 200 of an appliance cluster 500 may comprise a multi-core appliance, as discussed above. In many such embodiments, the core management and flow distribution methods discussed above may be utilized by each individual appliance, in addition to the node management and distribution methods discussed herein. This may be thought of as a two-tier distributed system, with one appliance comprising and distributing data to multiple nodes, and each node comprising and distributing data for processing to multiple cores. Accordingly, in such embodiments, the node distribution system need not manage flow distribution to individual cores, as that may be taken care of by a master or control core as discussed above.

In many embodiments, an appliance cluster 500 may be physically grouped, such as a plurality of blade servers in a chassis or plurality of rack mount devices in a single rack, but in other embodiments, the appliance cluster 500 may be distributed in a plurality of chassis, plurality of racks, plurality of rooms in a data center, plurality of data centers, or any other physical arrangement. Accordingly, the appliance cluster 500 may be considered a virtual appliance, grouped via common configuration, management, and purpose, rather than a physical group.

In some embodiments, an appliance cluster 500 may be connected to one or more networks 104, 104'. For example, referring briefly back to FIG. 1A, in some embodiments, an appliance 200 may be deployed between a network 104 joined to one or more clients 102, and a network 104' joined to one or more servers 106. An appliance cluster 500 may be similarly deployed to operate as a single appliance. In many embodiments, this may not require any network topology changes external to appliance cluster 500, allowing for ease of installation and scalability from a single appliance scenario. In other embodiments, an appliance cluster 500 may be similarly deployed as shown in FIGS. 1B-1D or discussed above. In still other embodiments, an appliance cluster may comprise a plurality of virtual machines or processes executed by one or more servers. For example, in one such embodiment, a server farm may execute a plurality of virtual machines, each virtual machine configured as an appliance 200, and a plurality of the virtual machines acting in concert as an appliance cluster 500. In yet still other embodiments, an appliance cluster 500 may comprise a mix of appliances 200 or virtual machines configured as appliances 200. In some embodiments, appliance cluster 500 may be geographically distributed, with the plurality of appliances 200 not co-located. For example, referring back to FIG. 5, in one such embodiment, a first appliance 200a may be located at a first site, such as a data center and a second appliance 200b may be located at a second site, such as a central office or corporate headquarters. In a further embodiment, such geographically remote appliances may be joined by a dedicated network, such as a T1 or T3 point-to-point connection; a VPN; or any other type and form of network. Accordingly, although there may be additional communications latency compared to co-located appliances 200a-200b, there may be advantages in reliability in case of site power failures or communications outages, scalability, or other benefits. In some embodiments, latency issues may be reduced through geographic or network-based distribution of data flows. For example, although configured as an appliance cluster 500, communications from clients and servers at the corporate headquarters may be directed to the appliance 200b deployed at the site, load balancing may be weighted by location, or similar steps can be taken to mitigate any latency.

Still referring to FIG. 5, an appliance cluster 500 may be connected to a network via a client data plane 502. In some embodiments, client data plane 502 may comprise a communication network, such as a network 104, carrying data between clients and appliance cluster 500. In some embodiments, client data plane 502 may comprise a switch, hub, router, or other network devices bridging an external network 104 and the plurality of appliances 200a-200n of the appliance cluster 500. For example, in one such embodiment, a router may be connected to an external network 104, and connected to a network interface of each appliance 200a-200n. In some embodiments, this router or switch may be referred to as an interface manager, and may further be configured to distribute traffic evenly across the nodes in the application cluster 500. Thus, in many embodiments, the interface master may comprise a flow distributor external to appliance cluster 500. In other embodiments, the interface master may comprise one of appliances 200a-200n. For example, a first appliance 200a may serve as the interface master, receiving incoming traffic for the appliance cluster 500 and distributing the traffic across each of appliances 200b-200n. In some embodiments, return traffic may similarly flow from each of appliances 200b-200n via the first appliance 200a serving as the interface master. In other embodiments, return traffic from each of appliances 200b-200n may be transmitted directly to a network 104, 104', or via an external router, switch, or other device. In some embodiments, appliances 200 of the appliance cluster not serving as an interface master may be referred to as interface slaves 510A-510N.

The interface master may perform load balancing or traffic flow distribution in any of a variety of ways. For example, in some embodiments, the interface master may comprise a router performing equal-cost multi-path (ECMP) routing with next hops configured with appliances or nodes of the cluster. The interface master may use an open-shortest path first (OSPF) In some embodiments, the interface master may use a stateless hash-based mechanism for traffic distribution, such as hashes based on IP address or other packet information tuples, as discussed above. Hash keys and/or salt may be selected for even distribution across the nodes. In other embodiments, the interface master may perform flow distribution via link aggregation (LAG) protocols, or any other type and form of flow distribution, load balancing, and routing.

In some embodiments, the appliance cluster 500 may be connected to a network via a server data plane 502. Similar to client data plane 502, server data plane 502 may comprise a communication network, such as a network 104', carrying data between servers and appliance cluster 500. In some embodiments, server data plane 502 may comprise a switch, hub, router, or other network devices bridging an external network 104' and the plurality of appliances 200a-200n of the appliance cluster 500. For example, in one such embodiment, a router may be connected to an external network 104', and connected to a network interface of each appliance 200a-200n. In many embodiments, each appliance 200a-200n may comprise multiple network interfaces, with a first network interface connected to client data plane 502 and a second network interface connected to server data plane 502. This may provide additional security and prevent direct interface of client and server networks by having appliance cluster 500 server as an intermediary device. In other embodiments, client data plane 502 and server data plane 502 may be merged or combined. For example, appliance cluster 500 may be deployed as a non-intermediary node on a network with clients 102 and servers 106. As discussed above, in many embodiments, an interface master may be deployed on the server data plane 502, for routing and distributing communications from the servers and network 104' to each appliance of the appliance cluster. In many embodiments, an interface master for client data plane 502 and an interface master for server data plane 502 may be similarly configured, performing ECMP or LAG protocols as discussed above.

In some embodiments, each appliance 200a-200n in appliance cluster 500 may be connected via an internal communication network or back plane 506. Back plane 506 may comprise a communication network for inter-node or inter-appliance control and configuration messages, and for inter-node forwarding of traffic. For example, in one embodiment in which a first appliance 200a communicates with a client via network 104, and a second appliance 200b communicates with a server via network 104', communications between the client and server may flow from client to first appliance, from first appliance to second appliance via back plane 506, and from second appliance to server, and vice versa. In other embodiments, back plane 506 may carry configuration messages, such as interface pause or reset commands; policy updates such as filtering or compression policies; status messages such as buffer status, throughput, or error messages; or any other type and form of inter-node communication. In some embodiments, RSS keys or hash keys may be shared by all nodes in the cluster, and may be communicated via back plane 506. For example, a first node or master node may select an RSS key, such as at startup or boot, and may distribute this key for use by other nodes. In some embodiments, back plane 506 may comprise a network between network interfaces of each appliance 200, and may comprise a router, switch, or other network device (not illustrated). Thus, in some embodiments and as discussed above, a router for client data plane 502 may be deployed between appliance cluster 500 and network 104, a router for server data plane 502 may be deployed between appliance cluster 500 and network 104', and a router for back plane 506 may be deployed as part of appliance cluster 500. Each router may connect to a different network interface of each appliance 200. In other embodiments, one or more planes 502-506 may be combined, or a router or switch may be split into multiple LANs or VLANs to connect to different interfaces of appliances 200a-200n and serve multiple routing functions simultaneously, to reduce complexity or eliminate extra devices from the system.

In some embodiments, a control plane (not illustrated) may communicate configuration and control traffic from an administrator or user to the appliance cluster 500. In some embodiments, the control plane may be a fourth physical network, while in other embodiments, the control plane may comprise a VPN, tunnel, or communication via one of planes 502-506. Thus, the control plane may, in some embodiments, be considered a virtual communication plane. In other embodiments, an administrator may provide configuration and control through a separate interface, such as a serial communication interface such as RS-232; a USB communication interface; or any other type and form of communication. In some embodiments, an appliance 200 may comprise an interface for administration, such as a front panel with buttons and a display; a web server for configuration via network 104, 104' or back plane 506; or any other type and form of interface.

In some embodiments, as discussed above, appliance cluster 500 may include internal flow distribution. For example, this may be done to allow nodes to join/leave transparently to external devices. To prevent an external flow distributor from needing to be repeatedly reconfigured on such changes, a node or appliance may act as an interface master or distributor for steering network packets to the correct node within the cluster 500. For example, in some embodiments, when a node leaves the cluster (such as on failure, reset, or similar cases), an external ECMP router may identify the change in nodes, and may rehash all flows to redistribute traffic. This may result in dropping and resetting all connections. The same drop and reset may occur when the node rejoins. In some embodiments, for reliability, two appliances or nodes within appliance cluster 500 may receive communications from external routers via connection mirroring.

In many embodiments, flow distribution among nodes of appliance cluster 500 may use any of the methods discussed above for flow distribution among cores of an appliance. For example, in one embodiment, a master appliance, master node, or interface master, may compute a RSS hash, such as a Toeplitz hash on incoming traffic and consult a preference list or distribution table for the hash. In many embodiments, the flow distributor may provide the hash to the recipient appliance when forwarding the traffic. This may eliminate the need for the node to recompute the hash for flow distribution to a core. In many such embodiments, the RSS key used for calculating hashes for distribution among the appliances may comprise the same key as that used for calculating hashes for distribution among the cores, which may be referred to as a global RSS key, allowing for reuse of the calculated hash. In some embodiments, the hash may be computed with input tuples of transport layer headers including port numbers, internet layer headers including IP addresses; or any other packet header information. In some embodiments, packet body information may be utilized for the hash. For example, in one embodiment in which traffic of one protocol is encapsulated within traffic of another protocol, such as lossy UDP traffic encapsulated via a lossless TCP header, the flow distributor may calculate the hash based on the headers of the encapsulated protocol (e.g. UDP headers) rather than the encapsulating protocol (e.g. TCP headers). Similarly, in some embodiments in which packets are encapsulated and encrypted or compressed, the flow distributor may calculate the hash based on the headers of the payload packet after decryption or decompression. In still other embodiments, nodes may have internal IP addresses, such as for configuration or administration purposes. Traffic to these IP addresses need not be hashed and distributed, but rather may be forwarded to the node owning the destination address. For example, an appliance may have a web server or other server running for configuration or administration purposes at an IP address of 1.2.3.4, and, in some embodiments, may register this address with the flow distributor as its internal IP address. In other embodiments, the flow distributor may assign internal IP addresses to each node within the appliance cluster 500. Traffic arriving from external clients or servers, such as a workstation used by an administrator, directed to the internal IP address of the appliance (1.2.3.4) may be forwarded directly, without requiring hashing.

F. Systems and Methods for Detecting a Cause of Anomalous Load Balancing

The present disclosure is directed towards systems and methods for detecting uneven load balancing through multi-level outlier detection. In particular, the present application relates to systems and methods for detecting a cause of anomalous load balancing among a plurality of servers. The anomalous load balancing can refer to or include one or more of the backend servers not receiving an even share of the load, and can be due to a malfunction, misconfiguration, or other network issues that can cause the load on the remaining backend servers to increase.

For example, the system can identify a scenario in which a virtual server executed by a device intermediary to client and backend servers is load-balancing its backend servers unevenly. This behavior can lead to a larger than expected overall delay for client requests and directly impact the user experience. The system can identify and mitigate the case of the uneven load balancing using multi-level algorithm, function, process or technique. In the multi-level process, the system can automatically identify that an uneven load exists among the backend server, and then automatically correlate the uneven load with one or more possible causes from a predetermined list of potential causes.

The intermediary device can periodically collect, obtain or otherwise identify values of various counters showing the behavior of different servers and virtual servers (vservers). For each time stamp, the intermediary device can monitor the loads assigned by each vserver (e.g., load balancer vserver running on the intermediary device) to corresponding backend servers, and detect anomalous behavior. For example, the intermediary device can identify cases where one or more server loads are different than others using a statistical technique (e.g., a Box Plot method) to detect outliers. Once this anomaly is identified, the intermediary device can correlate the anomaly with other counters that indicate the cause of the uneven load. Counters can include, for example, server delay counters, persistence counters (which can indicate that a particular subset of traffic is being sent to a particular server), surge counters, etc. While anomalies in some of these counters (e.g., server delay counter) can indicate a genuine problem, the anomalies in other counters (e.g., persistence counter) can indicate a configuration side-effect.

To identify that an uneven load exists among the backend server, and then automatically correlate the uneven load with one or more possible causes from a predetermined list of potential causes, the system can collect data from several counters. For example, to determine the load on each of a plurality of backend servers, the system can collect values for hit counters for each of the servers that indicate a level of utilization of the server. The system can determine if there is an uneven load on one of the servers based on a statistical analysis, such as the box plot method. For each server, the system can further identify if an additional counter from a predefined set of culprit counters is an outlier. For example, the system can obtain a first value for a first culprit counter for a first server, a second value for the first culprit counter for a second server, a third value for the first culprit counter for a third server, a fourth value for the first culprit counter for a fourth server, a fifth value for the first culprit counter for a fifth server, etc. The system can then process or analyze the first value, second value, third value, fourth value and fifth value to identify an outlier. For example, the system can use a statistical technique such as the box plot technique to determine that the first value is the outlier. Thereafter, the system can correlate the first value for the first counter with the outlier server to determine if the first counter is the cause of the uneven load balancing. For example, if the first server is the server having a hit count that resulted in the first server being identified as the outlier server, and the first value of the first culprit counter resulted in the first culprit counter being an outlier, then the system can automatically determine that the cause of the anomaly is related to the first culprit counter.

Figure 6:
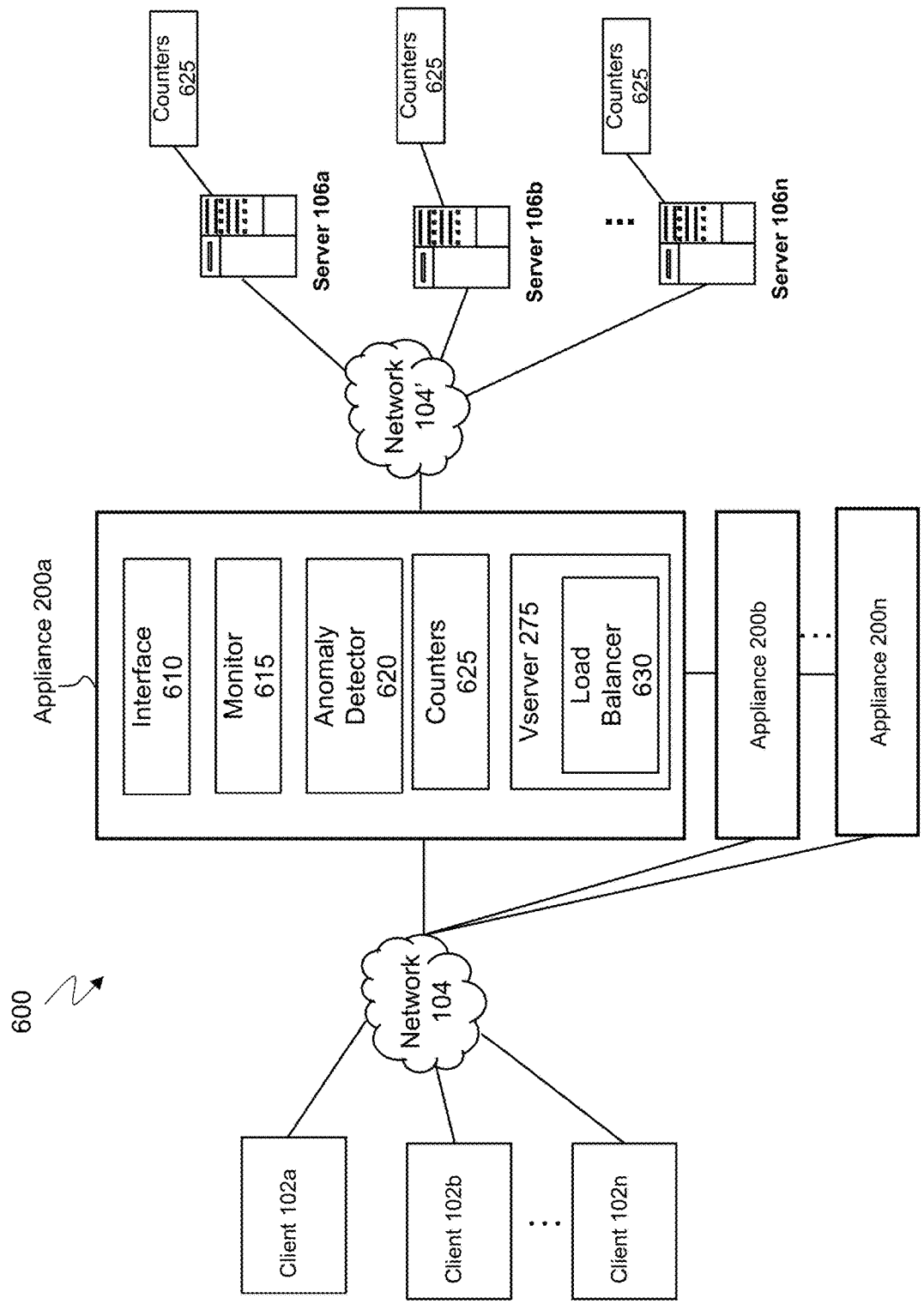
FIG. 6 is a block diagram of an embodiment of a system to detect a cause of anomalous load balancing.

Now referring now to FIG. 6, a block diagram of an embodiment of a system to detect a cause of anomalous load balancing is shown. The system 600 can include one or more appliances 200*a-n*. The appliances 200*a-n* can be configured with one or more features or functionality. The appliances 200*a-n* can each be configured with similar functionality, or different functionality. The appliances 200*a-n* can be referred to as a device intermediary to a plurality of clients 102*a-n* and a plurality of servers 106*a-n*. In some embodiments, appliance 200*a* includes an interface 610 configured to interface or communicate with clients 102*a-n* and servers 106*a-n*. The device 200*a* can include a monitor 615 configured to collect, receive, obtain or otherwise identify performance or statistical information associated with servers 106*a-n* or vservers 275. The device 200*a* can include an anomaly detector 620 configured to process the collected statistical information to identify a cause of anomalous load balancing among the plurality of servers 106*a-n*. The device 200*a* can include a load balancer 630 (e.g., executed by or on a vserver 275) that is configured to direct network traffic from clients 102*a-n* to servers 106*a-n* using one or more load balancing techniques. The device 200*a* can include vserver 275. The device 200*a* can execute a vserver 275. The interface 610, monitor 615, anomaly detector 620, counters 625 or load balancer 630 can execute on one or more vservers 275 that executes on one or more processors of device 200*a*. The system 600 can refer to or include the computing infrastructure. The computing infrastructure can include or refer to the one or more servers 106*a-n*.

The appliance 200*a* (or referred generally as appliance 200 or device 200) can include one or more functionality or component of appliance cluster 500 depicted in FIG. 5. The appliance 200 can manage or optimize the delivery of services, website content, resources or applications provided via the servers 106*a-n* over the network 104 or network 104', by providing application-level security, optimization, or traffic management. The appliance 200 may be the same or similar to the appliance cluster 500 described above with respect to FIGS. 1-5, or include one or more functionality or components thereof. In some embodiments, the clients 102*a-n* are the same or similar to the clients 102*a-n* and the servers 106*a-n* are the same or similar to the servers 106*a-n* as described above with respect to FIGS. 1-6, or include one or more functionality or components thereof. In some embodiments, the clients 102 and servers 106 of system 600 are further configured to perform functions or provide features for authenticating a client. The interface 610, monitor 615, anomaly detector 620, counters 625, or load balancer 630 can include digital circuitry, hardware, one or more processors, memory or software designed, constructed and configured to facilitate managing cloud-based services.

Still referring to FIG. 6, and in further detail, appliance 200*a* includes an interface 610. The interface 610 can include an application programming interface, a graphical user interface, communication ports, or be configured with one or more communication or networking protocols, such as TCP/IP, etc. The interface 610 can be configured to receive or intercept data packets, receive data packets, monitor network traffic, or otherwise obtain or transmit/convey information via network 104 or network 104'.

In some embodiments, the interface 610 receives a request from a client 102*a* of the plurality of clients 102*a-n*. The interface 610 may receive the request via a networking protocol, communication protocol, application layer protocol, transport protocol, or encryption protocol. Protocols can include, e.g., HTTP, TCP, ICA, or HDX. The protocol can be a stateful protocol or a stateless protocol. The request may include information about the client or the resource to which the client 102*a* is requesting access. In some embodiments, the resource provided by server 106*a-n* may be a secure resource for which a client or user of the client device may require authentication, authorization or approval before access is granted.

In some embodiments, the interface 610 is designed and constructed to receive network communications from one or more clients 102*a-n* and forward or direct network communications to one or more servers 106*a-n*. The interface 610 can be the same or similar to the interfaces 508 or 510*a-n* described above with respect to FIGS. 1-5, or include one or more functionality or components thereof. The interface 610 can receive data packets from a client 102*a*. The interface 610 can forward or relay the data packets received from client 102*a* to a destination server. For example, the interface 610 can be configured to automatically forward data packets received from a client agent 120*a* to a server 106*a* or instance 745. The interface 610 can be further configured to attract network traffic from clients 102*a-n* based on a state or mode of the appliance 200*a*. For example, appliance 200*a* may be the primary device 200*a*. The primary device 200*a* can refer to the intermediary device of an active-standby intermediary appliance pair that is currently in the active mode. Thus, the interface 610 of appliance 200*a* can receive network traffic from clients 102*a-n* if appliance 200*a* is currently the primary device configured to actively service requests from clients, and forward the requests to one or more servers 106*a-n*.

The device 200*a* can include one or more vservers 275 that are executing to direct network traffic from multiple clients 102*a-n* to multiple servers 106*a-n*. The device 200*a* can include a load balancer 630, executed by or on the vserver 275, designed and constructed to use a load balancing function to direct network traffic from the client. The load balancer 630 can distribute workloads across multiple servers 106*a-n* or computing resources to optimize resource use, increase throughput, reduce response time, and avoid overload of a single server or resource. In some cases, the load balancing function can cause the load balancer 630 to select a server 106. For example, the load balancer 630 can receive a data packet or request from a client 102. The load balancer 630 can retrieve or identify weights or loads assigned to servers 106*a-n*, and apply a load balancing function using the weights to select a server 106 to direct network traffic from the client.

In some embodiments, the load balancer 630 can use a load balancing algorithm (or load balancing technique) that defines criteria that the appliance 200*a* can use to select the server to which to direct traffic. When the load balancer 630 determines that the configured criteria are met for one server, the appliance 200 can then select a different server to distribute load evenly. In some cases, the load balancer 630 can select servers using a least connection technique or a round robin load balancing technique. The least connections technique can select the server with the least number of active connections to balance the load of the active requests among servers and instances thereof. When two or more of the servers 106*a-n* have the same number of active connections, the load balancer 630 can apply a round robin technique to distribute the requests evenly in turn across the servers with the same number of active connections.

The device 200 can include a monitor 615 configured to collect values of counters 625. The counters 625 can maintain values for various metrics or statistical information associated with resource utilization, hardware utilization, network utilization, or other server or computing utilization. Example counters 625 are illustrated in the following Table 1:

TABLE 1

Illustrative Example of Counters 625

| Counter Name | Counter Description |
|---|---|
| vsvr_IPAddr | IP address of the virtual server |
| vsvr_Port | The port of the virtual server |
| vsvr_Protocol | Protocol associated with the virtual server |
| vsvr_Type | Virtual server type, CONTENT or ADDRESS |
| vsvr_flags | Virtual server Internal Flags |
| SO_thresh | Spill Over Threshold set on the Virtual server |

TABLE 1-continued

Illustrative Example of Counters 625

| Counter Name | Counter Description |
|---|---|
| sys_cur_virtual_servers | Total number of virtual servers configured on the NetScaler appliance |
| vsvr_IPstr | IP address of the virtual server |
| vsvr_tot_Hits | Total virtual server hits |
| vsvr_tot_Miss | Total virtual server misses |
| vsvr_tot_err_pgcnt | Total virtual server error page count |
| vsvr_num_so | Number of times virtual server experienced spill over |
| vsvr_cur_labelled_conn | Number of Labeled connection on this virtual server |
| vsvr_push_cur_labels | Number of labels for this push virtual server |
| vsvr_tot_deferred_request | Number of deferred request on this virtual server |
| vsvr_tot_rdpcookie_parsed | Number of times MSTS RDP Cookie got parsed on this virtual server |
| vsLB_Persistence | Persistence setting for the virtual server |
| vsLB_Health | Health of the virtual server. This gives percentage of services bound to this virtual server that are marked with the status as UP. |
| vscsw_flags | Flags for all kinds of Content Switching virtual servers |
| nic_tot_rx_bytes | This counter tracks the total bytes received on the specified interface. |
| nic_rx_avg_bandwidth | This counter tracks the average RX bandwidth on the specified interface in bits per second. |
| nic_tot_rx_packets | This counter tracks the number of packets received on the specified interface. |
| nic_rx_avg_packet_rate | This counter tracks the average rate of incoming packets on the specified interface after the NetScaler appliance has started. |
| tcp_cur_surgequeuelen | Connections in the surge queue. When the NetScaler appliance cannot open a connection to the server, for example when maximum connections are reached, the appliance queues these requests. |

Counters 625 can include any other counter or component configured to obtain statistical information, including, for example, application flow counters, compression counters, internet protocol counters, secure socket layer counters, system counters, TCP counters, UDP counters, virtual server counters, audit log counters, SNMP counters, IPv6 counters, SSLVPN counters, priority queuing counters, high availability counters, HTTP denial of service protection counters, integrated caching counters, ICMP counters, network interface card counters, DNS counters, HTTP counters, etc.

The counters 625 can be configured to track statistical information related to vservers 275, load balancer 630, or servers 106a-n. The counters 625 can store the statistical information in memory of the device 200a or corresponding server 106a, or other repository. The counters 625 can store the statistical information in a data structure.

The counters 625 can store statistical information for a time interval. The counters 625 can indicate a start time stamp and stop time stamp for the statistical information. For example, the counter 625 can indicate that the number of server hits from a start_date_time to a stop_date_time was 1000.

The monitor 615 can collect values of a plurality of counters identifying statistics of the plurality of servers 106a-n and one or more virtual servers 275. The monitor 615 can poll, ping, query, request, fetch or otherwise collect the statistical information from counters 625. In some cases, the counters 625 can push the statistical information to monitor 615. The monitor 615 can request the statistical information based on a time interval (e.g., 1 minute, 2 minutes, 5 minutes, 10 minutes, 15 minutes, 30 minutes, 1 hour, 2 hours, 3 hours, 6 hours, 12 hours, 24 hours, 48 hours, or other time interval), periodically, or responsive to an event or trigger condition.

The monitor 615 can collect statistical information from a predetermined set of counters that facilitate determining a cause of anomalous load balancing. For example, to reduce processor utilization, bandwidth utilization, input/output request, and memory consumption, the monitor 615 can collect statistical information from a subset of all available counters 625 that are correlated with causes of anomalous load balancing. For example, the monitor 615 can collect server hits information from servers 106a-n, server delay counters, persistence counters (which indicate that a particular subset of traffic is being sent to a particular server), or surge counters. The values for the counters 625 can include numerical values, binary values (e.g., 0 or 1; Y or N), alphanumeric values, strings, or other characters. The monitor 615 can associate the collected statistical information with a time interval or time stamps.

The anomaly detector 620 can receive the statistical information collected by monitor 615 and analyze the statistical information. The anomaly detector 620 can use a multi-level processing technique to determine a cause of uneven load balancing. For example, the anomaly detector 620 can identify server of the plurality of servers 106a-n that is an outlier. The anomaly detector 620 can determine the outlier server by applying a statistical analysis technique to, for example, values of the server hits counter for each of the plurality of servers 106a-n. The anomaly detector 620 can determine which of the server hits values is an outlier, and further determine the server 106a-n corresponding to the outlier value. For example, the server hits value for a first server 106a can be 500; a server hits value for a second server 106b can be 505; a server hits value for a third server 106c can be 503; and a server hits value for a fourth server 106d can be 1000. The anomaly detector 620 can apply a box plot method or other statistical technique to determine that the server hits value 1000 is the outlier, which corresponds to the fourth server 106d. Thus, the anomaly detector 620 can flag, identify, or otherwise label the fourth server 106d as the outlier server to indicate that the fourth server has been unevenly load balanced based on at least a comparison of a number of server hits for each of the plurality of during the time interval.

The anomaly detector 620 can then identify a set of culprit counters. Culprit counters can refer to a predetermined set of counters that can indicate a cause of the anomalous load balancing. For example, the server hits counter can be used to identify which server 106 is the outlier indicating the existence of uneven or anomalous load balancing, and the culprit counters can indicate a cause of the anomalous load balancing. The set of predetermined culprit counters can be established by an administrator of the device 200, by a machine learning technique, by a crowd sourcing technique, or other technique. The predetermined set of culprit counters can be selected based on the type of servers 106a-n that are load balanced, the type of load balancing function used by load balancer 630, industry, or other factors. The predetermined set of culprit counters can be tailored for the computing environment 600, or based on historical performance information associated with computing environment 600.

For example, the administrator can identify or define, via a data file or graphical user interface, a set of culprit counters that can indicate a cause of anomalous load balancing. The administrator can update, modify, or change the predetermined set of culprit counters. The administrator may add or remove counters from the predetermined set of culprit counters. For example, if the anomaly detector 620 fails to identify the cause of the anomalous load balancing with the set of predetermined culprit counters, the administrator can add additional counters to the set of predetermined culprit counters. In some cases, if one or more counters from the set of predetermined counters are historically not identified as the cause of the anomalous load balancing, the one or more counters can be removed from the set of predetermined counters to reduce resource utilization.

In some cases, the device 200 can use multiple sets predetermined culprit counters. The multiple sets can include overlapping counters or different counters. For example, if the anomaly detector 620 does not identify a cause of the anomalous load balancing using a first set of predetermined culprit counters, the anomaly detector 620 can instruct the monitor 615 to collect statistical information from a second set of predetermined counters that can include different or additional statistical information as compared to the first set of predetermined counters. By using different sets of predetermined counters, the anomaly detector can reduce collected statistical information and data processing.

Responsive to collecting statistical information from a predetermined set of culprit counters, the anomaly detector can determine a counter of the plurality of counters that is an outlier. For example, the predetermined set of counters can include a first counter. The anomaly detector 620 can determine a first value for the first counter for the first server 106*a*; a second value for the first counter for the second server 106*b*; a third value for the first counter for the third server 106*c*; and a fourth value for the first counter for the fourth server 106*d*. The anomaly detector 620 can compare the first value, the second value, the third value, and the fourth value to determine the outlier value. For example, the anomaly detector 620 can use a statistical technique, such as a box plot technique, to determine that the fourth value is the outlier value. The anomaly detector 620 can then correlate the fourth value with the fourth server 106*d* because the fourth value corresponds to the counter 625 configured to monitor statistical information on the fourth server 106*d*.

In some cases, the anomaly detector 620 may determine that the first counter does not have an outlier value, and proceed with analyzing each of the values for a second counter, or each of the values for a third counter, etc., until an outlier value for a counter is identified. Once an outlier value is identified, the anomaly detector 620 can label the counter corresponding to the outlier value as an outlier counter.

Responsive to identifying an outlier counter, the anomaly detector 620 can determine if the outlier value for the outlier counter corresponds to or is correlated with the outlier server; e.g., if the outlier value corresponds to statistical information collected from the outlier server. Responsive to determining that the outlier counter is correlated with the outlier server, the anomaly detector 620 can provide or generate an indication that the counter is a factor causing the server to have uneven load balancing during the time interval.

In some cases, the anomaly detector 620 can apply a policy to determine if the outlier counter indicates the cause of the anomalous load balancing. For example, there may be cases in which the value of the outlier counter corresponds to a desired or expected behavior. The policies can be based on or take into account a configuration of a counter, a configuration of the load balancer, a configuration of one or more servers 106*a-n*, or other factors associated with the computing environment 600.

For example, the anomaly detector 620 can identify values for each counter 625 of the predetermined set of culprit counters associated with each of the plurality of servers 106*a-n* during the identified time interval. The anomaly detector 620 can determine, based on the identified values and a statistical outlier detection algorithm, that a first counter of the predetermined set of culprit counters is the outlier counter. The anomaly detector 620 can then determine a type for the first counter. The type can refer to a type of configuration of the counter, type of statistical information collected by the counter, or other behavior or setup of the counter. For example, the type of counter can indicate that the counter is defined by configuration. Defined by configuration can refer to the counter indicating fixed information, constant information, identifying information, configuration information, a constant, or other information that may not indicate statistical information indicative of statistical utilization information or a cause of anomalous load balancing.

If the anomaly detector 620 determines that the outlier counter is not defined by configuration, the anomaly detector 620 can determine, based on the counter not defined by the configuration, that the counter is (or indicative of) the cause of the anomaly in the server that is the outlier during the time interval. If, however, the anomaly detector 620 determined that the counter is defined by configuration, the anomaly detector 620 can determine that the counter is not indicative of the cause of the anomalous load balancing. The anomaly detector 620 can then proceed to analyzing other counters in the predetermined set of culprit counters for an outlier counter that corresponds to the outlier server. If the anomaly detector 620 does not find an outlier counter that corresponds to the outlier server that is not defined by configuration, the anomaly detector 620 can indicate that the cause of the anomaly is unknown or cannot be determined by the predetermined set of culprit counters. In some cases, the anomaly detector 620 can use a second set of predetermined culprit counters and proceed with collecting values for the second set of predetermined culprit counters to find an outlier counter correlated with the outlier server.

The anomaly detector 620 can periodically, or based on some other time interval or trigger condition, collect statistical information. For example, in a second time interval subsequent to, or different from, the first time interval, the anomaly detector can identify a second server of the plurality of servers that is being the outlier server (e.g., a second outlier server) indicating uneven load balancing based on server hits values. Uneven load balancing can refer to or result in the number of hits on a server being statistically different (e.g., a difference greater than a threshold; greater than 10%, 25%, 50%, 60%; an absolute value such as 5 more hits, 10 more hits, 20 more hits; a percentile; or standard deviations from an average value, etc.) from the number of hits on the remaining servers in the set of servers. The monitor 615 can collect values for the predetermined set of culprit counters for each of the plurality of servers 106*a-n*. The anomaly detector 620 can determine, based on the identified values for the predetermined set of culprit counters during the second time interval that a second counter from the predetermined set of culprit counters is the second outlier counter, which may be different from the first outlier counter identified in the first time interval.

The anomaly detector 620 can apply the policy to the second outlier counter to determine if the second outlier counter is indicative of the cause of the anomalous load balancing. For example, the second outlier counter may be defined by configuration, in which case the anomaly detector 620, based on the policy, can determine that the second outlier counter is not indicative of the cause of the anomalous load balancing during the second time interval.

In some cases, the anomaly detector may determine that none of the counters of the predetermined culprit counters is an outlier during the second time interval. In some cases, the anomaly detector may determine that none of the outlier counters in second time interval are indicative of the cause of the anomalous load balancing based on the policy (e.g., the outlier counters are defined by configuration). The anomaly detector 620 can select, based on the absence of any counter that is an outlier, a second indication of a cause of an anomaly in the second server that is different from the indication. For example, the second indication can indicate that the cause is unknown, cannot be determined, due to a defined configuration, etc.

The anomaly detector 620 can be configured with one or more statistical techniques to determine an outlier value for a counter. The statistical technique can be used to determine the outlier server or outlier counter from the predetermined set of culprit counters. Statistical techniques can include, for example, an outlier detection algorithm such as a box plot, a comparison with a model, or a normal probability plot.

An outlier value can correspond to a value from a set of values that does not belong, match, or correspond with the remaining values in the set of values. The box plot method can include or refer to a histogram-like method of processing or displaying data. In the box plot method, the anomaly detector 620 can identify a box with ends at the quartiles Q1 and Q3 of the values. The anomaly detector 620 can identify a statistical median as a line in the box. The anomaly detector 620 can then identify the farthest values that are not outliers (e.g., that are within 3/2 times the interquartile range of Q1 and Q3. Then, for every point more than 3/2 times the interquartile range from the end of a box, the anomaly detector 620 can determine an outlier value.

The anomaly detector 620 can use other outlier detection techniques to identify a value that is distance from other values for the counter. Outlier detection techniques can include distance based technique, density-based techniques, k-nearest neighbor, or a local outlier factor. In some cases, the anomaly detector 620 can use a model-based outlier detection technique. For example, the anomaly detector 620 can use a semi-supervised anomaly detection technique to construct a model representing normal behavior for counters from a given normal training data set, and then test the likelihood of a test instance to be generated by the learnt model.

In some cases, the anomaly detector 620 can use a normal probability plot to identify an outlier value. The normal probability plot can refer to a technique that can identify substantive departures from normality. Using the normal probability plot technique, the anomaly detector 620 can sort the collected values for a counter of the predetermined set of culprit counters and plot the sorted values versus values selected to make the resulting image approximately resemble a straight light if the data is approximately normally distributed. The anomaly detector 620 can then identify deviations from the straight line as a departure from normality, or an outlier value.

Responsive to determining that the outlier counter is indicative of the cause of the anomalous load balancing resulting in uneven load on the outlier server, the device 200 can automatically perform one or more functions or actions to facilitate re-balancing the load among the plurality of servers. The device can adjust a load balancer of the device balancing the load on the plurality of servers to even the load on the plurality of servers. The device can automatically and responsively launch, initiate, execute or invoke a script to re-balance the load among the plurality of servers. In some cases, the device can select a script, function or action to perform based on the type of outlier counter. For example, the anomaly detector 620 can be configured with a table mapping types of outlier counters to remedial actions or functions to address the anomalous behavior indicated by the outlier counter. In some cases, the device 200 can perform one or more functions until the load is balanced on the outlier server. The device 200 can perform a hierarchy of functions until the load is balance or the load is reduced on the outlier server.

Functions or actions can include, for example, switching to a secondary appliance 200b in the appliance cluster 500; resetting the configuration or weights used by the load balancer 630; resetting the virtual server 275 running the load balancer 630; terminating the instance of the load balancer 630 or virtual server 275 and initiating or invoking a new instance of the load balancer 630; switching to a different load balancing function; adjusting the weights assigned to the outlier server such that load balancer does not direct traffic from clients 102 to the outlier server; blocking selection of the outlier server for new traffic from clients 102; blocking selection of the outlier server for traffic from clients 102 until the load on the outlier server is even among the plurality of servers; removing the outlier server from the pool of available servers for load balancing; or offloading tasks or persistent connections to the outlier server to another server from the plurality of servers.

Figure 7:
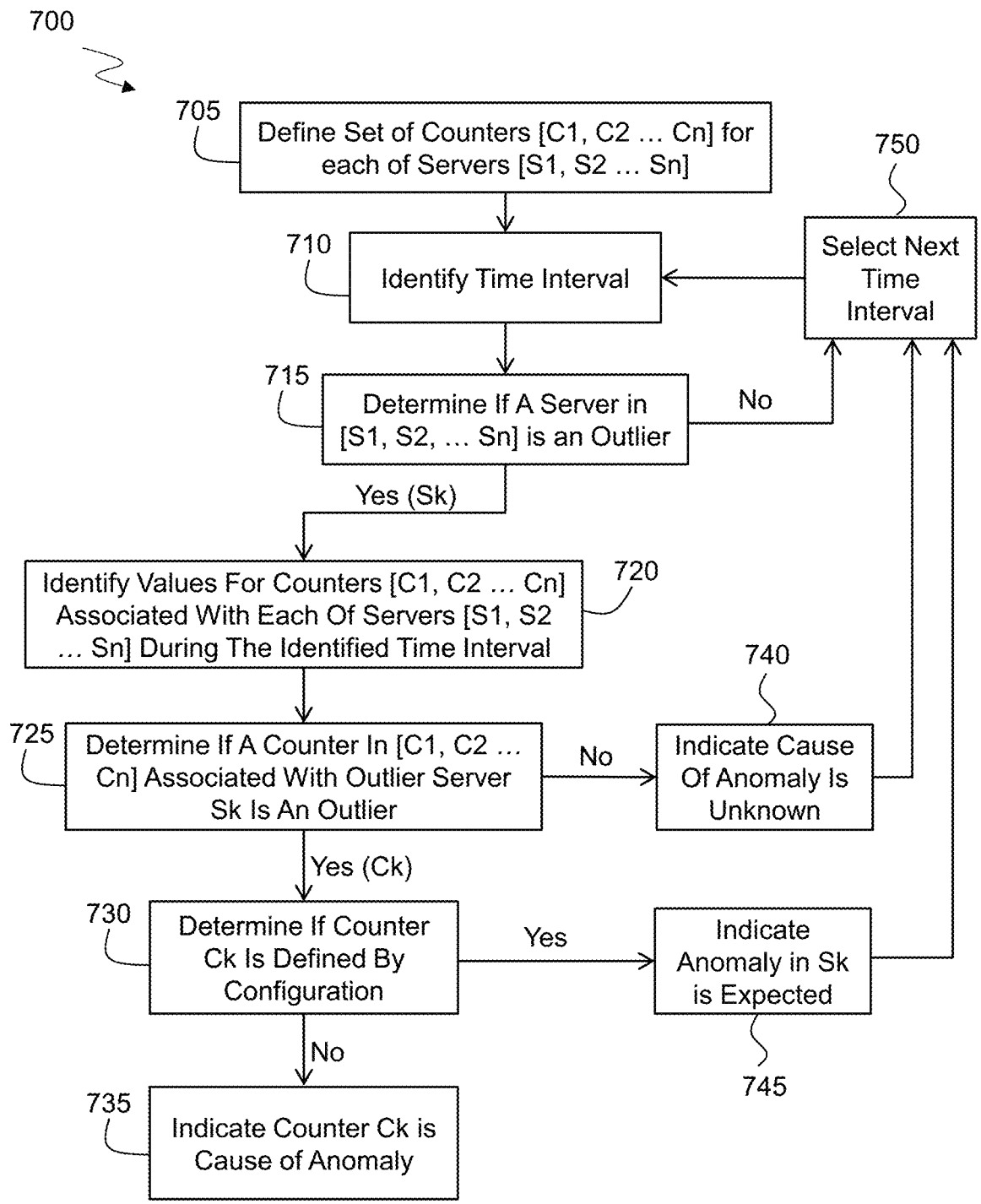
FIG. 7 is a flowchart for an example method of detecting a cause of anomalous load balancing, in accordance with an embodiment.

Referring now to FIG. 7, a flowchart for an example method of detecting a cause of anomalous load balancing, in accordance with an embodiment is shown. The method 700 can be performed using one or more system or component described in FIGS. 1-6. For example, device 200 of system 600 can perform the acts or functions of method 700.

At block 705, a set of counters [C1, C2 . . . Cn] for a plurality of servers [S1, S2, . . . Sn] is defined. The set of counters [C1, C2, . . . Cn] can refer to a predetermined set of culprit counters that can indicate a cause of anomalous load balancing. The set of counters [C1, C2 . . . Cn] can be defined or established by an administrator, or automatically. The counters [C1, C2, . . . Cn] can be invoked or initiated to track, monitor, or collect statistical information associated with the servers [S1, S2, . . . Sn]. Each of counters [C1, C2, . . . Cn] can be configured on each of the servers [S1, S2, . . . Sn]. For example, the counter C1 on Server S1 can be labeled as C11; the counter C1 on Server S2 can be labeled as C12; the counter C1 on server S3 can be labeled as C13, etc.

At block 710, the device can identify a time interval for which to collect statistical information. The time interval can include a start time stamp and a stop time stamp. The time interval can have a start time stamp and a duration. The time interval can be a first time interval in a series of periodic time intervals. The time interval can be a current time interval, a recently completed time interval, or an historical time interval for which the counters [C1, C2, . . . Cn] previously collected statistical information.

At block 715, the device can determine if a server in the set of servers [S1, S2, . . . Sn] is an outlier indicating uneven load balancing. The device can analyze server hits or another statistical counter associated with a load of the servers to determine an outlier server. If the device determines that one of the servers is an outlier (e.g., has uneven load based on server hits), then the device can proceed to block 720. The device can label the outlier server as Sk. If the device determines that none of the servers [S1, S2, . . . Sn] is an outlier during the selected time interval, the device can proceed to block 750 and select a next time interval for which to process statistical information. In some cases, selecting the next time interval can refer to waiting a period of time for the next time interval to complete such that there is complete statistical information for the next time interval. After collecting statistical information for the next time interval, the device can repeat the method from block 710.

If the device determines that one of the servers is an outlier (e.g., has uneven load based on server hits), then the device can proceed to block 720. At block 720, the device can identify values for culprit counters [C1, C2, . . . Cn] that are associated with each of the servers [S1, S2, . . . Sn] during the time interval identified at block 710. For example, the device can utilize a monitor to collect the values for the counters [C1, C2, . . . Cn] for each of the servers [S1, S2, . . . Sn] during the time interval. In some cases, the device can collect the information from one of the counters in the set [C1, C2, . . . Cn] for each of the servers [S1, S2, . . . Sn] at a time, and process the values for just one counter at a time to identify an outlier counter, and then proceed with identifying values for the second counter C2.

At block 725, the device can determine if a counter in the set of culprit counters [C1, C2, . . . Cn] is an outlier counter, and then determine if the outlier counter is associated or correlated with the outlier server Sk. The device can label the outlier counter as Ck and proceed to block 730. If the device is unable to identify an outlier counter in the set of predetermined culprit counters [C1, C2, . . . Cn], the device can proceed to block 740 an indicate that the cause of the anomaly is unknown. The device can then proceed to block 750 to select the next time interval, and proceed to repeat the method at block 710.

If, at block 725, the device identifies a value for an outlier counter that is an outlier and correlated with the outlier server Sk, the device can proceed to block 730. At block 730, the device can apply a policy to determine if the identified outlier counter that is correlated with the outlier server is indeed indicative of a cause of the anomalous load balancing resulting in an uneven load on server Sk. For example, the device at block 730 can determine if the outlier counter is defined by configuration. If the counter is not defined by configuration, the device can proceed to block 730 and indicate that counter Ck is the cause of the anomaly. If, on the other hand, the outlier counter is defined by configuration, the device can proceed to block 745 and indicate that the uneven load balancing on server Sk is expected behavior. The device can proceed to block 750 to select the next time interval, and then repeat the method at block 710.

Referring now to FIG. 8, a flowchart for an example method of detecting a cause of anomalous load balancing, in accordance with an embodiment is shown. The method 700 can be performed using one or more system or component described in FIGS. 1-6. For example, device 200 of system 600 can perform the acts or functions of method 700.

Referring now to FIG. 8, a block diagram of an embodiment of a method of detecting a cause of anomalous load balancing. is shown. The method 800 can be performed by one or more component or system depicted in FIGS. 1-6, or include one or actions illustrated in FIG. 7. For example, the method 800 can be performed by device 200 that is intermediary to a plurality of clients and a plurality of servers. The device can include, e.g., an interface 610, monitor 615, anomaly detector 620, counters 625, vserver 275, or load balancer 630. In brief overview, the device can collect values of counters at act 805. At act 810, the device can identify a server that is an outlier. At act 815, the device can determine a counter that is an outlier. At act 820, the device can provide an indication.

Still referring to FIG. 8, and in further detail, the device can collect values of counters at act 805. The device can collect values of a plurality of counters identifying statistics of the plurality of servers and one or more virtual servers of the device load balancing the plurality of servers. The device can ping, poll, query or otherwise request the statistical information from one or more counters that are established on the plurality of servers or virtual servers. For example, a counter can include a server hits counter that tracks this or requests received by the server. If the server is a web server, the hits or requests can refer to a request for a web page hosted by the web server, for example. If the server is providing a cloud service, such as software as a service, infrastructure as a service, or a platform as a service, the hits can refer to requests for the service or resource provided by the server.

At act 810, the device can identify a server that is an outlier. The device can automatically proceed with identifying the outlier server responsive to collecting server hits or other statistical information for a time interval. The device can periodically identify the outlier server responsive to a time interval. The device can identify a server of the plurality of servers that is an outlier indicating uneven load balancing based on at least a comparison of a number of server hits for each of the plurality of during a time interval. The device can use a statistical outlier detection technique such as box plot, a model, or a normal probability plot to identify the outlier server that correspond to uneven load balancing.

At act 815, the device can determine a counter that is an outlier. The device can determine the outlier counter responsive to identifying the outlier server. The device can automatically proceed with determining the outlier counter responsive to identifying the outlier server. The device can determine a counter of the predetermined plurality of culprit counters that is an outlier based on at least a comparison of values of each of the plurality of counters for each of the plurality of servers. The comparison can include a statistical outlier detection technique such as box plot, a model, or a normal probability plot to identify the outlier server that correspond to uneven load balancing.

At act 820, the device can provide an indication. The device can automatically provide an indication based on identifying the outlier counter is correlated with the outlier server. The device can provide, responsive to the determination, an indication that a value of the counter is a factor causing the server to have uneven load balancing during the time interval. In some cases, the device, automatically and responsive to determining that the outlier counter is correlated with the outlier server and is indicative of the cause of the anomalous load balancing, can invoke a script to perform an action or function to re-balance the load among the plurality of servers.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

References to "or" may be construed as inclusive so that any terms described using "or" may indicate any of a single, more than one, and all of the described terms.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed is:

1. A method of detecting a cause of anomalous load balancing among a plurality of servers, comprising:
   collecting, by a device intermediary to a plurality of clients and a plurality of servers, values of a plurality of counters identifying statistics for each server of the plurality of servers and one or more virtual servers of the device load balancing the plurality of servers;
   identifying, by an anomaly detector executed by the device, a server of the plurality of servers that is an outlier indicating uneven load balancing based on at least a comparison of a number of server hits for each of the plurality of servers during a time interval;
   determining, by the anomaly detector, from the plurality of counters for the identified server, that a counter identifying a statistic is an outlier based on at least a comparison of values of a corresponding counter of the plurality of counters identifying the statistic for each of the plurality of servers; and
   providing, by the anomaly detector responsive to the determination, an indication that a value of the counter is a factor causing the server to have uneven load balancing during the time interval.

2. The method of claim 1, comprising:
   establishing the plurality of counters from a predetermined set of counters that are correlated with causes of uneven load balancing.

3. The method of claim 1, comprising:
   determining, for each server of the plurality of servers, a value for each counter of the plurality of counters during the time interval;
   determining that the counter is the outlier based on a statistical outlier detection algorithm applied to the value for each counter of the plurality of counters for each of the plurality of servers; and
   adjusting a load balancer of the device balancing the load on the plurality of servers to even the load on the plurality of servers.

4. The method of claim 1, comprising:
   for each counter of the plurality of counters, identifying values associated with each of the plurality of servers during the time interval;
   determining, based on the identified values and a statistical outlier detection algorithm, that the counter that is the outlier;
   identifying a type of counter corresponding to the counter; and
   determining, based on a policy and the type of counter, the cause of the anomaly.

5. The method of claim 1, comprising:
   for each counter of the plurality of counters, identifying values associated with each of the plurality of servers during the time interval;
   determining, based on the identified values and a statistical outlier detection algorithm, that the counter that is the outlier;
   identifying a type of configuration of the counter; and
   determining, based on a policy and the type of configuration, the cause of the anomaly from a plurality of candidate causes of anomalies.

6. The method of claim 1, comprising:
   for each counter of the plurality of counters, identifying values associated with each of the plurality of servers during the time interval;
   determining, based on the identified values and a statistical outlier detection algorithm, that the counter that is the outlier;
   identifying, from a plurality of types of counters, that the counter is not defined by a configuration; and
   determining, based on the counter not defined by the configuration, that the counter is the cause of the anomaly in the server that is the outlier during the time interval.

7. The method of claim 1, comprising:
   identifying a second server of the plurality of servers that is a second outlier of uneven load balancing during a second time interval;
   for each counter of the plurality of counters, identifying values associated with each of the plurality of servers during the second time interval;
   determining, based on the identified values and a statistical outlier detection algorithm, a second counter from the plurality of outlier counters that is a second outlier;
   identifying, from a plurality of types of counters, that the second counter is defined by a configuration; and
   determining, based on the second counter defined by the configuration, that the second counter is not a cause of an anomaly in the second server during the second time interval.

8. The method of claim 1, comprising:
   identifying a second server of the plurality of servers that is a second outlier of uneven load balancing during a second time interval;

for each counter of the plurality of counters, identifying values associated with each of the plurality of servers during the second time interval;
determining, based on the identified values and a statistical outlier detection algorithm, an absence of any counter among the plurality of counters that is an outlier during the second time interval; and
selecting, based on the absence of any counter that is an outlier, a second indication of a cause of an anomaly in the second server, the second indication different from the indication.

9. The method of claim 1, comprising:
identifying loads on each of the plurality of servers based on server hits during the time interval.

10. The method of claim 1, comprising:
forwarding, by the one or more virtual servers, the network traffic from the plurality of client devices to the plurality of servers using at least one of a least connection load balancing technique or a round robin load balancing technique;
determining, by the anomaly detector, the server that is the outlier using a first statistical outlier detection algorithm, the first statistical outlier detection algorithm comprising at least one of a box plot, a model, or a normal probability plot; and
determining, by the anomaly detector, the counter using a second statistical outlier detection algorithm, the second statistical outlier detection algorithm comprising at least one of the box plot, the model, or the normal probability plot.

11. A system to detect a cause of anomalous load balancing among a plurality of servers, comprising:
a monitor executed by a device intermediary to a plurality of clients and a plurality of servers configured to collect values of a plurality of counters identifying statistics for each server of the plurality of servers and one or more virtual servers of the device load balancing the plurality of servers;
an anomaly detector executed by the device configured to:
identify a server of the plurality of servers that is an outlier indicating uneven load balancing based on at least a comparison of a number of server hits for each of the plurality of servers during a time interval;
determine, from the plurality of counters for the identified server, that a counter identifying a statistic is an outlier based on at least a comparison of values of a corresponding counter of the plurality of counters identifying the statistic for each of the plurality of servers; and
provide, responsive to the determination, an indication that a value of the counter is a factor causing the server to have uneven load balancing during the time interval.

12. The system of claim 11, wherein the device is further configured to:
establish the plurality of counters from a predetermined set of counters that are correlated with causes of uneven load balancing.

13. The system of claim 11, wherein the device is further configured to:
determine, for each server of the plurality of servers, a value for each counter of the plurality of counters during the time interval;
determine that the counter is the outlier based on a statistical outlier detection algorithm applied to the value for each counter of the plurality of counters for each of the plurality of servers; and
adjust a load balancer of the device balancing the load on the plurality of servers to even the load on the plurality of servers.

14. The system of claim 11, wherein the device is further configured to:
for each counter of the plurality of counters, identify values associated with each of the plurality of servers during the time interval;
determine, based on the identified values and a statistical outlier detection algorithm, that the counter is the outlier;
identify a type of counter corresponding to the counter; and determine, based on a policy and the type of counter, the cause of the anomaly.

15. The system of claim 11, wherein the device is further configured to:
for each counter of the plurality of counters, identify values associated with each of the plurality of servers during the time interval;
determine, based on the identified values and a statistical outlier detection algorithm, that the counter is the outlier;
identify a type of configuration of the counter; and
determine, based on a policy and the type of configuration, the cause of the anomaly from a plurality of candidate causes of anomalies.

16. The system of claim 11, wherein the device is further configured to:
for each counter of the plurality of counters, identify values associated with each of the plurality of servers during the time interval;
determine, based on the identified values and a statistical outlier detection algorithm, that the counter is the outlier;
identify, from a plurality of types of counters, that the counter is not defined by a configuration; and
determine, based on the counter not defined by the configuration, that the counter is the cause of the anomaly in the server that is the outlier during the time interval.

17. The system of claim 11, wherein the device is further configured to:
identify a second server of the plurality of servers that is a second outlier of uneven load balancing during a second time interval;
for each counter of the plurality of counters, identify values associated with each of the plurality of servers during the second time interval;
determine, based on the identified values and a statistical outlier detection algorithm, a second counter from the plurality of outlier counters that is a second outlier;
identify, from a plurality of types of counters, that the second counter is defined by a configuration; and
determine, based on the second counter defined by the configuration, that the second counter is not a cause of an anomaly in the second server during the second time interval.

18. The system of claim 11, wherein the device is further configured to:
identify a second server of the plurality of servers that is a second outlier of uneven load balancing during a second time interval;
for each counter of the plurality of counters, identify values associated with each of the plurality of servers during the second time interval;
determine, based on the identified values and a statistical outlier detection algorithm, an absence of any counter among the plurality of counters that is an outlier during the second time interval; and select, based on the absence of any counter that is an outlier, a second indication of a cause of an anomaly in the second server, the second indication different from the indication.

19. The system of claim 11, wherein the device is further configured to:

identify loads on each of the plurality of servers based on server hits during the time interval.

20. The system of claim 11, wherein the device is further configured to:

forward, by the one or more virtual servers, the network traffic from the plurality of client devices to the plurality of servers using at least one of a least connection load balancing technique or a round robin load balancing technique;

determine, by the anomaly detector, the server that is the outlier using a first statistical outlier detection algorithm, the first statistical outlier detection algorithm comprising at least one of a box plot, a model, or a normal probability plot; and determine, by the anomaly detector, the counter using a second statistical outlier detection algorithm, the second statistical outlier detection algorithm comprising at least one of the box plot, the model, or the normal probability plot.

* * * * *